United States Patent
Yamane et al.

(10) Patent No.: US 10,924,672 B2
(45) Date of Patent: Feb. 16, 2021

(54) CAMERA CONTROLLER

(71) Applicant: RENESAS ELECTRONICS CORPORATION, Tokyo (JP)

(72) Inventors: Shunya Yamane, Tokyo (JP); Mitsumasa Murakami, Tokyo (JP); Takeshi Ohtsuki, Tokyo (JP); Mamoru Morotomi, Tokyo (JP); Akihiro Nakatani, Tokyo (JP); Akihisa Nomura, Tokyo (JP); Aritsune Nagamura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 11 days.

(21) Appl. No.: 16/193,923

(22) Filed: Nov. 16, 2018

(65) Prior Publication Data

US 2019/0199928 A1    Jun. 27, 2019

(30) Foreign Application Priority Data

Dec. 27, 2017  (JP) .............................. JP2017-251219

(51) Int. Cl.
*H04N 5/232* (2006.01)

(52) U.S. Cl.
CPC ..... *H04N 5/23258* (2013.01); *H04N 5/23261* (2013.01); *H04N 5/23287* (2013.01)

(58) Field of Classification Search
CPC ........... H04N 5/23248; H04N 5/23251; H04N 5/23258; H04N 5/23261; H04N 5/23264; H04N 5/2328; H04N 5/23283; H04N 5/23287
See application file for complete search history.

(56) References Cited

U.S. PATENT DOCUMENTS

| 8,432,468 | B2 | 4/2013 | Hoshino |
| 2007/0196086 | A1* | 8/2007 | Ishikawa ............ H04N 5/23248 396/55 |
| 2010/0134639 | A1* | 6/2010 | Takeuchi ............. G02B 27/646 348/208.4 |
| 2013/0034345 | A1* | 2/2013 | Miyahara ........... H04N 5/23258 396/55 |

(Continued)

FOREIGN PATENT DOCUMENTS

JP    2011-010285 A    1/2011

*Primary Examiner* — Albert H Cutler
(74) *Attorney, Agent, or Firm* — McDermott Will & Emery LLP

(57) ABSTRACT

An operation part calculates a shake amount of an imaging apparatus in accordance with a first operation system or a second operation system on the basis of an output signal of a sensor detecting an acceleration or angular velocity to determine a camera-shake correction amount correcting the shake amount. The operation part calculates the output signal of the sensor or a value obtained by integrating an integrated signal of the output signal of the sensor as a shake amount. The operation part includes an imperfect integrator. An operation system setting part sets an operation system of the operation part on the basis of the shake amount calculated by the operation part. In the second operation system, the operation system setting part increases a cut-off frequency of the imperfect integrator more than in the first operation system.

6 Claims, 18 Drawing Sheets

(56) References Cited

U.S. PATENT DOCUMENTS

| | | | |
|---|---|---|---|
| 2015/0036011 A1* | 2/2015 | Wakamatsu | H04N 5/2328 |
| | | | 348/208.7 |
| 2015/0172548 A1* | 6/2015 | Takeuchi | G02B 27/646 |
| | | | 348/208.6 |
| 2015/0309329 A1* | 10/2015 | Shibata | H04N 5/23258 |
| | | | 359/557 |
| 2016/0269640 A1* | 9/2016 | Watanabe | H04N 5/23267 |
| 2016/0316122 A1* | 10/2016 | Watanabe | H04N 5/23258 |
| 2019/0191092 A1* | 6/2019 | Imanishi | G03B 5/00 |

* cited by examiner

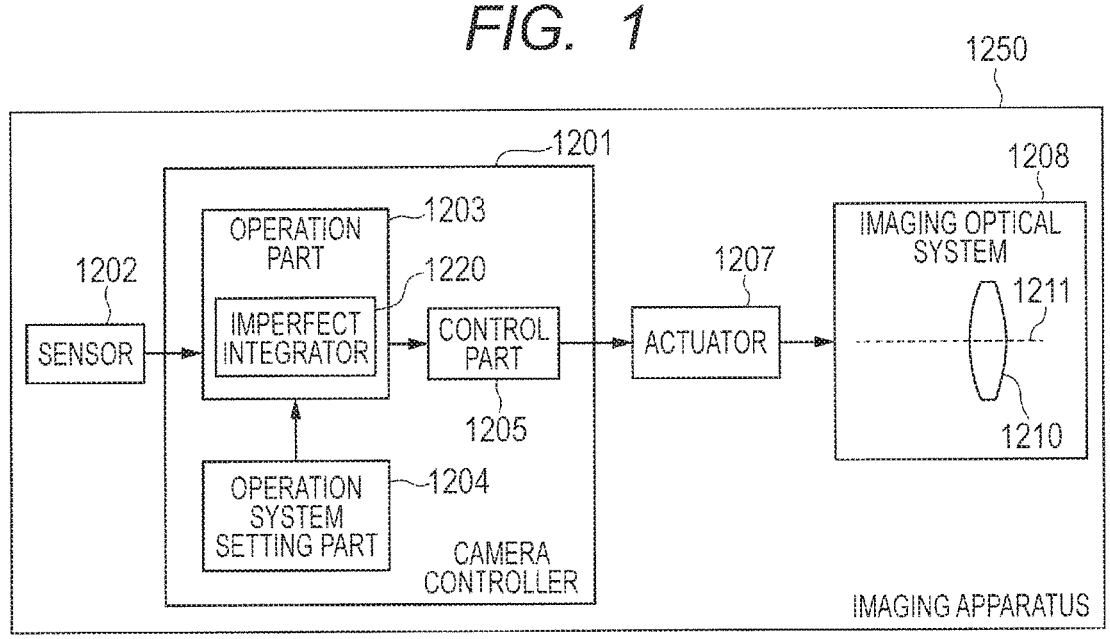
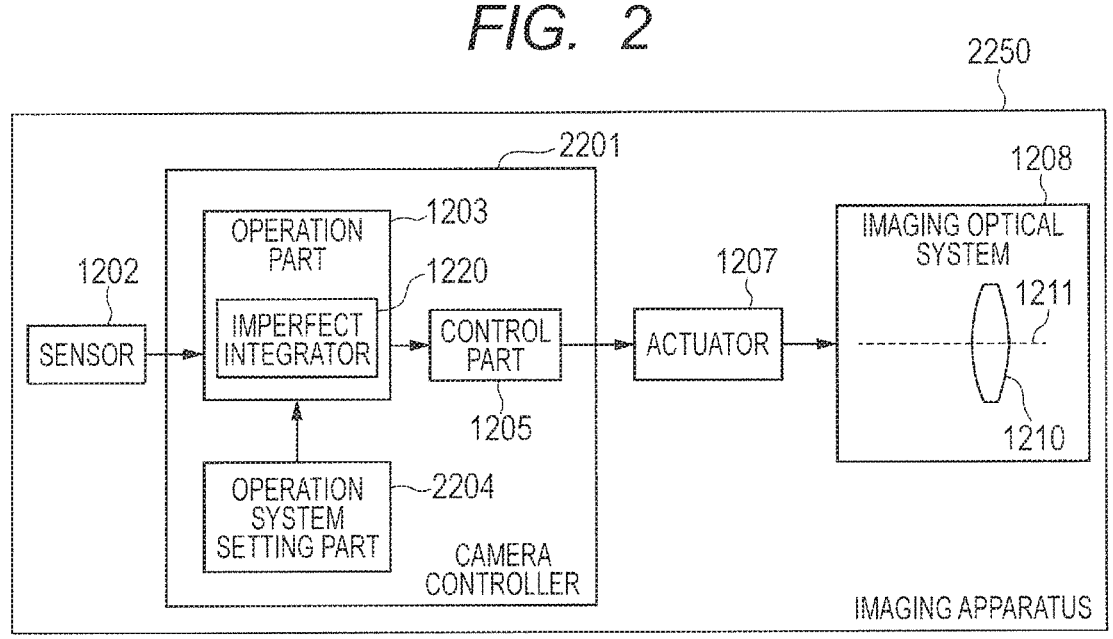

FIG. 7

| FLAG | IDENTIFICATION INFORMATION | REFERENCE DATA | OPERATION SYSTEM |
|---|---|---|---|
| FL1 | PRESENCE OR ABSENCE OF TILT OPERATION DUE TO ANGULAR SHAKE IN PITCH DIRECTION | ANGULAR SHAKE AMOUNT β1 IN PITCH DIRECTION | OPERATION SYSTEM OF FIRST ANGULAR SHAKE OPERATION PART |
| FL2 | PRESENCE OR ABSENCE OF PAN OPERATION DUE TO ANGULAR SHAKE IN YAW DIRECTION | ANGULAR SHAKE AMOUNT α1 IN YAW DIRECTION | OPERATION SYSTEM OF SECOND ANGULAR SHAKE OPERATION PART |
| FL3 | PRESENCE OR ABSENCE OF PAN OPERATION DUE TO SHIFT SHAKE IN X DIRECTION | SHIFT SHAKE AMOUNT XD IN X DIRECTION | OPERATION SYSTEM OF FIRST SHIFT SHAKE OPERATION PART |
| FL4 | PRESENCE OR ABSENCE OF TILT OPERATION DUE TO SHIFT SHAKE IN Y DIRECTION | SHIFT SHAKE AMOUNT YD IN Y DIRECTION | OPERATION SYSTEM OF SECOND SHIFT SHAKE OPERATION PART |

FIG. 12

| FLAG | IDENTIFICATION INFORMATION | REFERENCE DATA | OPERATION SYSTEM |
|---|---|---|---|
| FLP | PRESENCE OR ABSENCE OF TILT OPERATION | COMBINED ANGULAR SHAKE AMOUNT $\beta$ | OPERATION SYSTEM OF FIRST ANGULAR SHAKE OPERATION PART, OPERATION SYSTEM OF SECOND SHIFT SHAKE OPERATION PART |
| FLY | PRESENCE OR ABSENCE OF PAN OPERATION | COMBINED ANGULAR SHAKE AMOUNT $\alpha$ | OPERATION SYSTEM OF SECOND ANGULAR SHAKE OPERATION PART, OPERATION SYSTEM OF FIRST SHIFT SHAKE OPERATION PART |

FIG. 20

| FLAG | IDENTIFICATION INFORMATION | REFERENCE DATA | | OPERATION SYSTEM |
|---|---|---|---|---|
| FL1 | PRESENCE OR ABSENCE OF TILT OPERATION DUE TO ANGULAR SHAKE IN PITCH DIRECTION | ANGULAR VELOCITY IN PITCH DIRECTION | ACCELERATION IN Y DIRECTION | ANGULAR SHAKE AMOUNT $\beta 1$ IN PITCH DIRECTION | OPERATION SYSTEM OF FIRST ANGULAR SHAKE OPERATION PART |
| FL2 | PRESENCE OR ABSENCE OF PAN OPERATION DUE TO ANGULAR SHAKE IN YAW DIRECTION | ANGULAR VELOCITY IN YAW DIRECTION | ACCELERATION IN X DIRECTION | ANGULAR SHAKE AMOUNT $\alpha 1$ IN YAW DIRECTION | OPERATION SYSTEM OF SECOND ANGULAR SHAKE OPERATION PART |
| FL3 | PRESENCE OR ABSENCE OF PAN OPERATION DUE TO SHIFT SHAKE IN X DIRECTION | ANGULAR VELOCITY IN YAW DIRECTION | ACCELERATION IN X DIRECTION | SHIFT SHAKE AMOUNT XD IN X DIRECTION | OPERATION SYSTEM OF FIRST SHIFT SHAKE OPERATION PART |
| FL4 | PRESENCE OR ABSENCE OF TILT OPERATION DUE TO SHIFT SHAKE IN Y DIRECTION | ANGULAR VELOCITY IN PITCH DIRECTION | ACCELERATION IN Y DIRECTION | SHIFT SHAKE AMOUNT YD IN Y DIRECTION | OPERATION SYSTEM OF SECOND SHIFT SHAKE OPERATION PART |

FIG. 22

| FLAG | IDENTIFICATION INFORMATION | REFERENCE DATA | | OPERATION SYSTEM |
|---|---|---|---|---|
| FLP | PRESENCE OR ABSENCE OF TILT OPERATION | ANGULAR VELOCITY IN PITCH DIRECTION | ACCELERATION IN Y DIRECTION | COMBINED ANGULAR SHAKE AMOUNT β | OPERATION SYSTEM OF FIRST ANGULAR SHAKE OPERATION PART, OPERATION SYSTEM OF SECOND SHIFT SHAKE OPERATION PART |
| FLY | PRESENCE OR ABSENCE OF PAN OPERATION | ANGULAR VELOCITY IN YAW DIRECTION | ACCELERATION IN X DIRECTION | COMBINED ANGULAR SHAKE AMOUNT α | OPERATION SYSTEM OF SECOND ANGULAR SHAKE OPERATION PART, OPERATION SYSTEM OF FIRST SHIFT SHAKE OPERATION PART |

CAMERA CONTROLLER

CROSS-REFERENCE TO RELATED APPLICATIONS

The disclosure of Japanese Patent Application No. 2017-251219 filed on Dec. 27, 2017 including the specification, drawings and abstract is incorporated herein by reference in its entirety.

BACKGROUND

The present invention relates to a camera controller, and to a camera controller suitable for controlling a camera with optical image stabilizer, for example.

An imaging apparatus such as a digital camera or a smart phone or the like is provided with an optical image stabilizer mechanism because a camera shake is apt to occur when photographing.

The optical image stabilizer mechanism uses a sensor to detect the motion of the imaging apparatus. Since a signal sent from the sensor is an angular velocity or acceleration, an integrator is used to determine an angular shake or a shift shake (refer to, for example, Patent Document 1).

RELATED ART DOCUMENTS

Patent Document

[Patent Document 1] Japanese Unexamined Patent Publication Laid-Open No. 2011-010285

SUMMARY

However, when the imaging apparatus is pan/tilt-operated, there is a case in which an image is observed so as to move by a converging operation of the integrator included in the optical image stabilizer mechanism, despite the imaging apparatus being stationary.

Other objects and novel features of the present invention will become apparent from the description of the present specification and the accompanying drawings.

A camera controller according to one aspect of the present invention is equipped with an operation system setting part which sets an operation system of an operation part, based on a shake amount calculated by the operation part including an imperfect integrator. The operation system setting part increases a cut-off frequency of the imperfect integrator in a second operation system more than in a first operation system. Similarly, the cut-off frequency of the imperfect integrator can be decreased.

According to one aspect of the present invention, it is possible to avoid a state in which an image is observed so as to move in spite of an imaging apparatus being stationary.

BRIEF DESCRIPTION OF THE DRAWINGS

FIG. 1 is a diagram showing the configuration of a camera controller 1201 according to a first embodiment;

FIG. 2 is a diagram showing the configuration of a camera controller 2201 according to a second embodiment;

FIG. 7 is a diagram showing the relation of a flag, information identified by the flag, reference data referred to for setting the flag, and an operation system set by the flag in the third embodiment;

FIG. 12 is a diagram showing the relation of a flag, information identified by the flag, reference data referred to for setting the flag, and an operation system set by the flag in a fourth embodiment;

FIG. 20 is a diagram showing the relation of a flag, information identified by the flag, reference data referred to for setting the flag, and an operation system set by the flag in the sixth embodiment;

FIG. 22 is a diagram showing the relation of a flag, information identified by the flag, reference data referred to for setting the flag, and an operation system set by the flag in the seventh embodiment.

DETAILED DESCRIPTION

Figure 3:
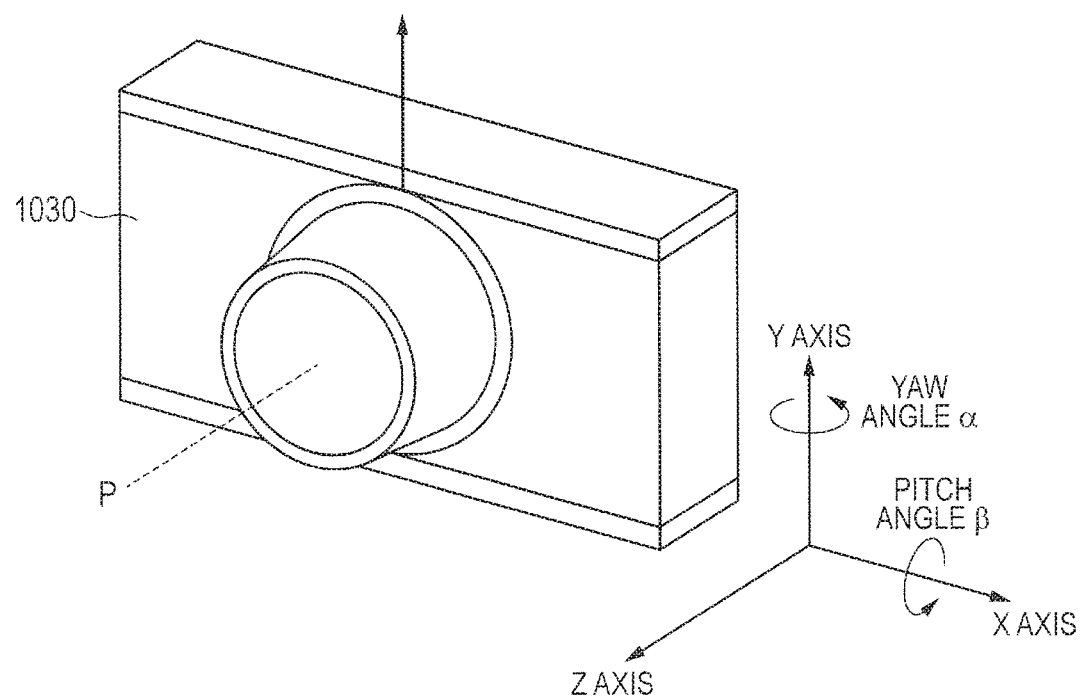
FIG. 3 is a diagram showing the axes of an imaging apparatus 1030.

Embodiments will hereinafter be described using the accompanying drawings.

First Embodiment

FIG. 1 is a diagram showing the configuration of a camera controller 1201 according to a first embodiment.

Referring to FIG. 1, the camera controller 1201 is mounted in an imaging apparatus 1250. The imaging apparatus 1250 is equipped with a sensor 1202, an actuator 1207, and an imaging optical system 1208 in addition to the camera controller 1201. The imaging optical system 1208 is equipped with a corrective lens 1210.

The corrective lens 1210 corrects the shake of an optical axis 1211 of the imaging optical system 1208.

The camera controller 1201 is equipped with an operation part 1203, an operation system setting part 1204, and a control part 1205.

The operation part 1203 calculates the amount of shake of the imaging apparatus 1250 in accordance with a first operation system or a second operation system on the basis of an output signal of the sensor 1202 mounted in the imaging apparatus 1250 and detecting acceleration or angular velocity and determines a camera-shake correction amount for correcting the shake amount.

The operation part 1203 calculates the output signal of the sensor 1202 or a value obtained by integrating an integrated signal of the output signal of the sensor 1202 as a shake amount. The operation part 1203 includes an imperfect integrator 1220.

The operation system setting part 1204 sets an operation system of the operation part 1203, based on the shake amount calculated by the operation part 1203. In the second operation system, the operation system setting part 1204 increases the cut-off frequency of the imperfect integrator 1220 more than in the first operation system.

The control part 1205 controls the actuator 1207 driving the corrective lens 1210 included in the imaging optical system 1208 on the basis of the camera-shake correction amount.

As described above, according to the present embodiment, in the second operation system set based on the shake amount calculated by the operation part, the cut-off frequency of the imperfect integrator is increased more than in the first operation system. Thus, when the imaging apparatus is pan/tilt-operated, it is possible to prevent a state in which an image is observed so as to move, by the conversing operation of the imperfect integrator included in the optical image stabilizer mechanism in spite of the imaging apparatus being stationary.

Second Embodiment

FIG. 2 is a diagram showing the configuration of a camera controller 2201 according to a second embodiment.

Referring to FIG. 2, the camera controller 2201 is mounted in an imaging apparatus 2250. The imaging apparatus 2250 is equipped with a sensor 1202, an actuator 1207, and an imaging optical system 1208 in addition to the camera controller 2201. The imaging optical system 1208 is equipped with a corrective lens 1210.

The corrective lens 1210 corrects the shake of an optical axis 1211 of the imaging optical system 1208.

The camera controller 2201 is equipped with an operation part 1203, an operation system setting part 2204, and a control part 1205.

The operation part 1203 calculates the amount of shake of the imaging apparatus 1250 in accordance with a first operation system or a second operation system on the basis of the output of the sensor 1202 mounted in the imaging apparatus 1250 and detecting acceleration or angular velocity and determines a camera-shake correction amount for correcting the shake amount.

The operation part 1203 calculates the output signal of the sensor 1202 or a value obtained by integrating an integrated signal of the output signal of the sensor 1202 as a shake amount. The operation part 1203 includes an imperfect integrator 1220.

The operation system setting part 2204 sets an operation system of the operation part 1203, based on the shake amount calculated by the operation part 1203. The operation system setting part 2204 causes the imperfect integrator 1220 to execute its integral operation in the first operation system. In the second operation system, the operation system setting part 2204 stops the integral operation of the imperfect integrator 1220, and reduces a value outputted from the imperfect integrator 1220 with time immediately before the stop of the integral operation of the imperfect integrator 1220 and causes the value to be outputted as a shake amount.

The control part 1205 controls the actuator 1207 driving the corrective lens 1210 included in the imaging optical system 1208 on the basis of the camera-shake correction amount.

As described above, according to the present embodiment, in the second operation system set based on the shake amount calculated by the operation part, the integral operation of the imperfect integrator is stopped, and the value outputted from the imperfect integrator immediately before the stop of the integral operation of the imperfect integrator is reduced with the time and outputted as the shake amount. Thus, as with the first embodiment, when the imaging apparatus is pan/tilt-operated, it is possible to prevent a state in which an image is observed so as to move, by the conversing operation of the imperfect integrator included in the optical image stabilizer mechanism, despite the imaging apparatus being stationary.

Incidentally, the operation system setting part 2204 may further stop the input to the imperfect integrator 1220 in the second operation system.

Third Embodiment

FIG. 3 is a diagram showing the axes of an imaging apparatus 1030.

A lateral direction (horizontal direction) is assumed to be an X-axis direction relative to the imaging apparatus 1030. In the X-axis direction, a right direction is assumed to be a plus (+) direction toward the imaging apparatus 1030, and a left direction is assumed to be a minus (−) direction theretoward. An upper/lower direction (vertical direction) is assumed to be a Y-axis direction relative to the imaging apparatus 1030. In the Y-axis direction, the upper direction is assumed to be a plus (+) direction toward the imaging apparatus 1030, and the lower direction is assumed to be a minus (−) direction theretoward. The direction of an optical axis P of an imaging optical system included in the imaging apparatus 1030 is assumed to be a Z-axis direction. The direction to a subject is assumed to be +, and the direction opposite to the subject direction is assumed to be −. A rotational direction with the Y-axis direction as an axis is assumed to be a yaw direction relative to the imaging apparatus 1030, and a rotational angle is assumed to be a yaw angle α relative thereto. A rotational direction with the X-axis direction as an axis is assumed to be a pitch direction relative to the imaging apparatus 1030, and a rotational angle is assumed to be a pitch angle β relative thereto.

In the yaw and pitch directions, the directions of arrows shown in FIG. 3 are respectively assumed to be a rotation in a plus (+) direction, and their opposite directions are respectively assumed to be a rotation in a − direction.

Of a rotating operation in the yaw direction and a shift operation in the X-axis direction, the operation following the intention of a user is called pan or panning and can be distinguished from the camera shake in that the shake amount is larger than the camera shake. Of a rotating operation in the pitch direction and a shift operation in the Y-axis direction, the operation following the intention of the user is called tilt or tilting and can be distinguished from the camera shake in that the shake amount is larger than the camera shake.

Figure 4:
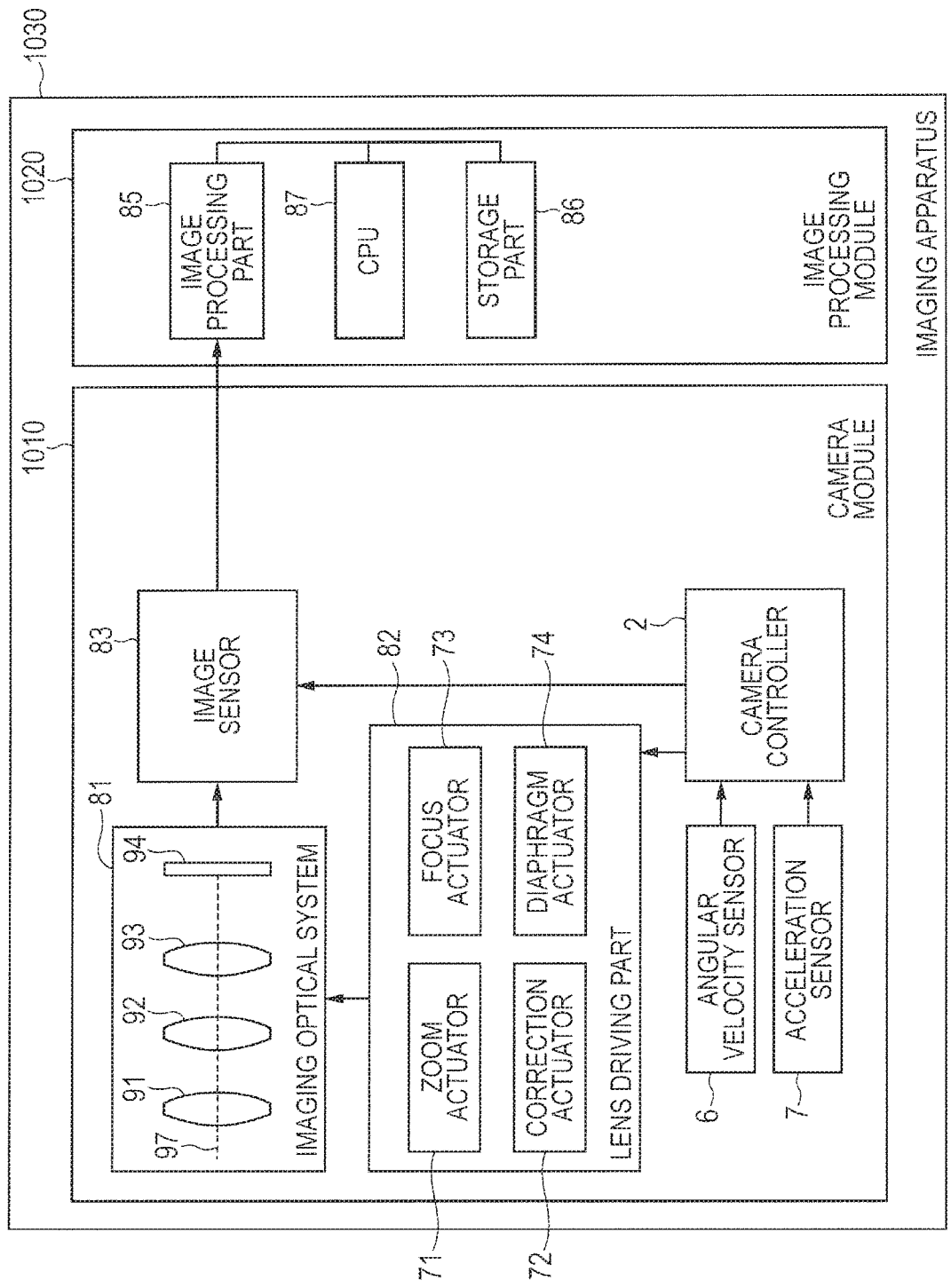
FIG. 4 is a diagram showing the configuration of the imaging apparatus 1030 according to a third embodiment.

FIG. 4 is a diagram showing the configuration of the imaging apparatus 1030 according to the third embodiment.

The imaging apparatus 1030 is equipped with a camera module 1010 and an image processing module 1020.

The camera module 1010 is equipped with an angular velocity sensor 6, an acceleration sensor 7, a camera controller 2, an imaging optical system 81, a lens driving part 82, and an image sensor 83.

The angular velocity sensor 6 is comprised of, for example, a gyro sensor. The angular velocity sensor 6 outputs an angular velocity signal indicative of an angular velocity of a vertical (pitch direction) shake and an angular velocity of a lateral (yaw direction) shake both shakes being angular shakes of the imaging apparatus 1030.

The acceleration sensor 7 outputs an acceleration signal indicative of an acceleration of an X-direction shake and an acceleration of a Y-direction shake in the imaging apparatus 1030.

The imaging optical system 81 is equipped with a zoom lens 91, a corrective lens 92, a focus lens 93, and a diaphragm 94.

The zoom lens 91 changes the magnification of an image of a subject. The corrective lens 92 is a lens movable within a surface perpendicular to an optical axis 97 of the imaging optical system 81. The corrective lens 92 reduces the shake of the image of the subject on the image sensor 83 by moving in the direction of canceling the shake of the imaging apparatus 1030. The focus lens 93 changes the focus state of the subject image formed in the image sensor 83. The diaphragm 94 adjusts the amount of light passing through the imaging optical system 81.

The lens driving part 82 includes a zoom actuator 71 driving the zoom lens 91, a correction actuator 72 driving the corrective lens 92, a focus actuator 73 driving the focus lens 93, and a diaphragm actuator 74 driving the diaphragm 94. The lens driving part 82 is operated in accordance with a control signal from the camera controller 2. The zoom actuator 71, the camera-shake correction actuator 72, the focus actuator 73, and the diaphragm actuator 74 may respectively be configured by, for example, a magnet and a flat coil.

The image sensor 83 captures the subject image formed by the imaging optical system 81 to generate image data. The image sensor 83 performs various operations such as exposure, transfer, and an electronic shutter, etc.

The image processing module 1020 is equipped with an image processing part 85, a CPU 87, and a storage part 86.

The image processing part 85 is comprised of an image processing DSP (Digital Signal Processor) or the like and performs image processing on digital image data outputted from the camera module 1010.

The CPU 87 executes an application program to thereby perform various processing using the digital image data.

The storage part 86 stores therein the digital image data, other various data, and the application program executed by the CPU 87.

Figure 5:
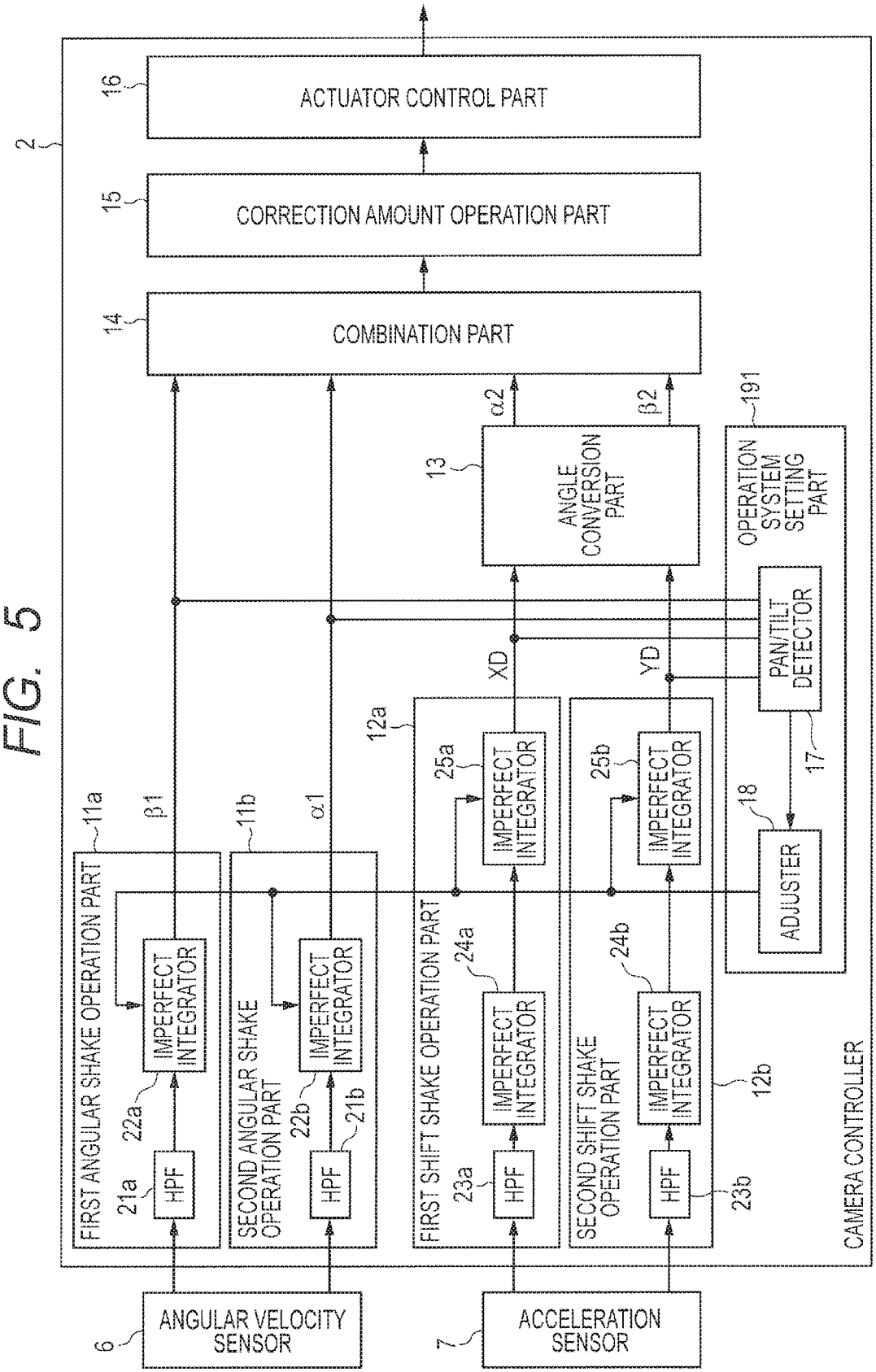
FIG. 5 is a diagram showing the configuration of a camera controller 2 according to the third embodiment.

FIG. 5 is a diagram showing the configuration of the camera controller 2 of the third embodiment.

The camera controller 2 is equipped with a first angular shake operation part 11a, a second angular shake operation part 11b, a first shift shake operation part 12a, a second shift shake operation part 12b, an angle conversion part 13, a combination part 14, a correction amount operation part 15, and an actuator control part 16.

The first angular shake operation part 11a calculates an angular shake amount β1 in a pitch direction of the imaging apparatus 1030 in accordance with the first operation system or the second operation system on the basis of an output signal of the angular velocity sensor 6. The first angular shake operation part 11a is equipped with a high-pass filter 21a and an imperfect integrator 22a.

The high-pass filter 21a removes an offset of a signal indicative of the angular velocity of a shake in the pitch direction, which is outputted from the angular velocity sensor 6.

The imperfect integrator 22a inputs therein the angular velocity of the shake in the pitch direction from which the offset is removed, and outputs the angular shake amount β1 in the pitch direction. The imperfect integrator 22a sets its cut-off frequency fc1 to LC1 where the first angular shake operation part 11a is set to the first operation system. The imperfect integrator 22a sets its cut-off frequency fc1 to HC1 where the first angular shake operation part 11a is set to the second operation system. However, HC1>LC1.

The imperfect integrator 22a functions as a low-pass filter having gain. The imperfect integrator 22a is configured by a primary IIR (Infinite Impulse Response) filter or one obtained by modifying the primary IIR filter. When the imperfect integrator 22a is configured by the primary IIR filter or the modified one of the primary IIR filter, the cut-off frequency fc1 can be changed by adjusting coefficients of these filters. The cut-off frequency fc1 can be made large by, for example, adjusting the coefficient of the filter as in the case in which the contribution of a new input is made large and the contribution of a past integrated value is made small. The same applies to the configurations of other imperfect integrators and the adjustments of cut-off frequencies thereof too in the following description.

The second angular shake operation part 11b calculates an angular shake amount α1 in a yaw direction of the imaging apparatus 1030 in accordance with the first operation system or the second operation system on the basis of an output signal of the angular velocity sensor 6. The second angular shake operation part 11b is equipped with a high-pass filter 21b and an imperfect integrator 22b.

The high-pass filter 21b removes an offset of a signal indicative of the angular velocity of a shake in the yaw direction, which is outputted from the angular velocity sensor 6.

The imperfect integrator 22b inputs therein the signal indicative of the angular velocity of the shake in the yaw direction from which the offset is removed, and outputs the angular shake amount α1 in the yaw direction.

The imperfect integrator 22b sets its cut-off frequency fc2 to LC2 where the second angular shake operation part 1ib is set to the first operation system. The imperfect integrator 22b sets its cut-off frequency fc2 to HC2 where the second angular shake operation part 1ib is set to the second operation system. However, HC2>LC2.

The imperfect integrator 22a and the imperfect integrator 22b can be made same or different in configuration. HC2 and HC1 are respectively set to values which are the same or different as/from each other. LC2 and LC1 are respectively set to values which are the same or different as/from each other.

The first shift shake operation part 12a calculates a shift shake amount XD in an X direction of the imaging apparatus 1030 in accordance with the first operation system or the second operation system on the basis of an output signal of the acceleration sensor 7. The first shift shake operation part 12a is equipped with a high-pass filter 23a, an imperfect integrator 24a, and an imperfect integrator 25a.

The high-pass filter 23a removes an offset of a signal indicative of the acceleration of a shake in the X direction, which is outputted from the acceleration sensor 7.

The imperfect integrator 24a inputs therein the acceleration of the shake in the X direction from which the offset is removed, and integrates the acceleration of the shake in the X direction to thereby output the velocity of the shake in the X direction.

The imperfect integrator 25a inputs therein the velocity of the shake in the X direction and outputs a shift shake amount XD in the X direction.

The imperfect integrator 25a sets its cut-off frequency fc3 to LC3 where the first shift shake operation part 12a is set to the first operation system. The imperfect integrator 25a sets its cut-off frequency fc3 to HC3 where the first shift shake operation part 12a is set to the second operation system. However, HC3>LC3.

The second shift shake operation part 12b calculates a shift shake amount YD in a Y direction of the imaging apparatus 1030 in accordance with the first operation system or the second operation system on the basis of an output signal of the acceleration sensor 7. The second shift shake operation part 12b is equipped with a high-pass filter 23b, an imperfect integrator 24b, and an imperfect integrator 25b.

The high-pass filter 23b removes an offset of a signal indicative of the acceleration of a shake in the Y direction, which is outputted from the acceleration sensor 7.

The imperfect integrator 24b inputs therein the acceleration of the shake in the Y direction from which the offset is removed, and integrates the acceleration of the shake in the Y direction to thereby output the velocity of the shake in the Y direction.

The imperfect integrator 25b inputs therein the velocity of the shake in the Y direction and outputs a shift shake amount YD in the Y direction.

The imperfect integrator 25b sets its cut-off frequency fc4 to LC4 where the first shift shake operation part 12a is set to the first operation system. The imperfect integrator 25b sets its cut-off frequency fc4 to HC4 where the first shift shake operation part 12a is set to the second operation system. However, HC4>LC4.

The imperfect integrator 25a and the imperfect integrator 25b can be made same or different in configuration. HC4 and HC3 are respectively set to values which are the same or different as/from each other. LC4 and LC3 are respectively set to values which are the same or different as/from each other.

The angle conversion part 13 converts the shift shake amounts XD and YD into angular shake amounts α2 and β2 respectively in accordance with a photographing distance D sent from an unillustrated autofocus part.

Figure 6A:
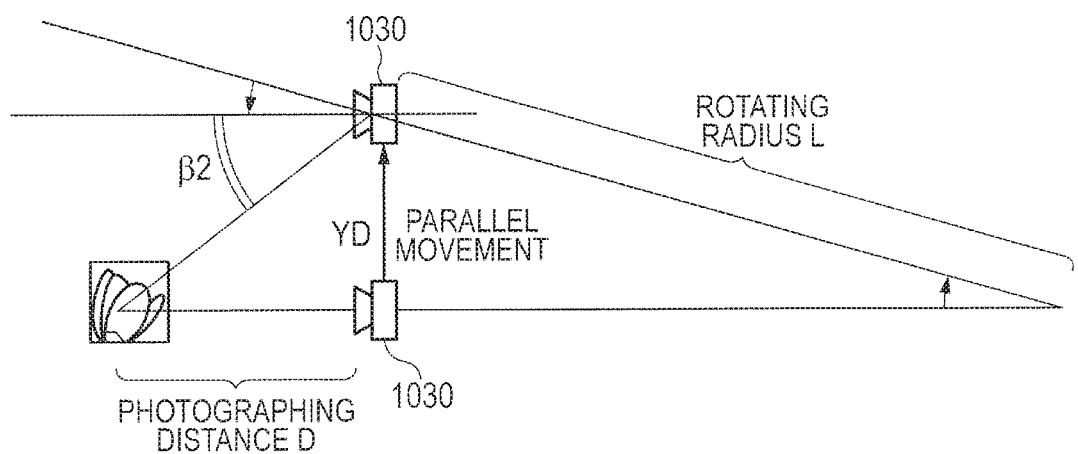
FIGS. 6A and 6B are diagrams for describing one example of angle conversion.
Figure 6B:
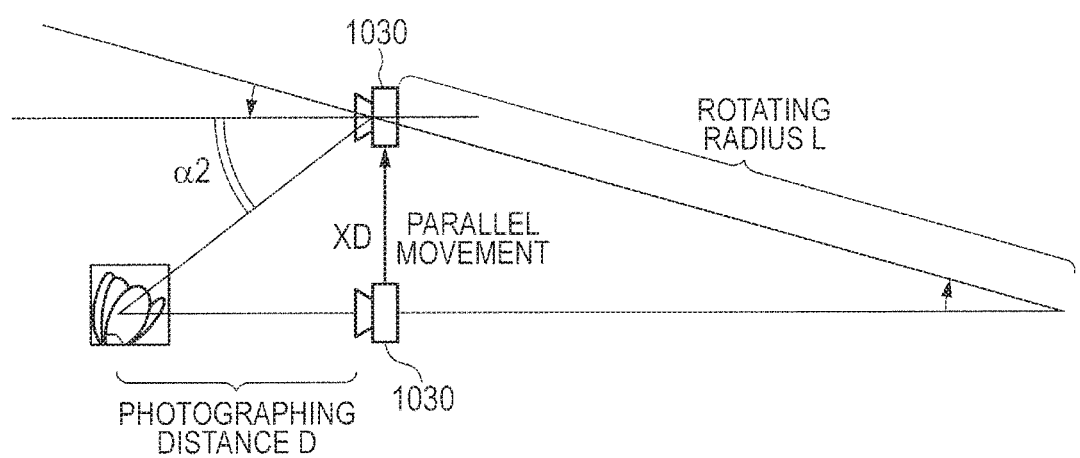

FIGS. 6A and 6B are diagrams for describing one example of angle conversion.

The imaging apparatus 1030 is assumed to be shifted in the X direction by XD and shifted in the Y direction by YD. In FIGS. 6A and 6B, a rotating radius L indicates the length of an arm or finger.

The shift shake amount XD in the X direction is converted into an angular shake amount α2 in the yaw direction as indicted by the following equation.

$$\alpha 2 = a\tan(XD/D) \tag{1}$$

The shift shake amount YD in the Y direction is converted into an angular shake amount β2 in the pitch direction.

$$\beta 2 = a\tan(YD/D) \tag{2}$$

The combination part 14 adds a value obtained by multiplying the angular shake amount α1 in the yaw direction outputted from the angular shake operation part 11 and a coefficient K1, and a value obtained by multiplying the angular shake amount α2 in the yaw direction outputted from the angle conversion part 13 and a coefficient K2 to determine a first combined angular shake amount α as expressed in the following equation.

$$\alpha = K1 \times \alpha 1 + K2 \times \alpha 2 \tag{3}$$

The combination part 14 adds a value obtained by multiplying the angular shake amount β1 in the pitch direction outputted from the angular shake operation part 11 and a coefficient K3, and a value obtained by multiplying the angular shake amount β2 in the pitch direction outputted from the angle conversion part 13 and a coefficient K4 to determine a second combined angular shake amount β as expressed in the following equation.

$$\beta = -K3 \times \beta 1 + K4 \times \beta 2 \tag{4}$$

The correction amount operation part 15 determines camera-shake correction amounts α' and β' for canceling the combined shake amount, based on the first combined angular shake amount α and the second combined angular shake amount β as expressed in the following equation.

The camera shake corrections of four axes (α, β, X, and Y) are made possible by the equations (3) through (6):

$$\alpha' = -\alpha \quad (5)$$

$$\beta' = -\beta \quad (6)$$

The actuator control part 16 controls the correction actuator 72 driving the corrective lens 92 included in the imaging optical system 81, based on the camera shake correction amounts α' and β'.

The operation system setting part 191 is equipped with a pan/tilt detector 17 and an adjuster 18.

FIG. 7 is a diagram showing the relation of a flag, information identified by the flag, reference data referred to for setting the flag, and an operation system set by the flag in the third embodiment.

The pan/tilt detector 17 detects the presence or absence of a tilt operation due to an angular shake in the pitch direction on the basis of the angular shake amount β1 in the pitch direction calculated by the first angular shake operation part 11a. The pan/tilt detector 17 sets a flag FL1 indicative of the presence or absence of the tilt operation due to the angular shake in the pitch direction. When the flag FL1 is "1", it indicates that the tilt operation due to the angular shake in the pitch direction is present. When the flag FL1 is "0", it indicates that the tilt operation due to the angular shake in the pitch direction is absent.

The adjuster 18 sets the operation system of the first angular shake operation part 11a, based on the flag FL1. When the flag FL1 is set to 0, the adjuster 18 sets the operation system of the first angular shake operation part 11a to the first operation system. When the flag FL1 is set to 1, the adjuster 18 sets the operation system of the first angular shake operation part 11a to the second operation system.

The pan/tilt detector 17 detects the presence or absence of a pan operation due to an angular shake in the yaw direction on the basis of the angular shake amount α1 in the yaw direction calculated by the second angular shake operation part 11b. The pan/tilt detector 17 sets a flag FL2 indicative of the presence or absence of the pan operation due to the angular shake in the yaw direction. When the flag FL2 is "1", it indicates that the pan operation due to the angular shake in the yaw direction is present. When the flag FL2 is "0", it indicates that the pan operation due to the angular shake in the yaw direction is absent.

The adjuster 18 sets the operation system of the second angular shake operation part 11b, based on the flag FL2. When the flag FL2 is set to 0, the adjuster 18 sets the operation system of the second angular shake operation part 11b to the first operation system. When the flag FL2 is set to 1, the adjuster 18 sets the operation system of the second angular shake operation part 11b to the second operation system.

The pan/tilt detector 17 detects the presence or absence of a pan operation due to a shift shake in the X direction on the basis of the shift shake amount XD in the X direction calculated by the first shift shake operation part 12a. The pan/tilt detector 17 sets a flag FL3 indicative of the presence or absence of the pan operation due to the shift shake in the X direction. When the flag FL3 is "1", it indicates that the pan operation due to the shift shake in the X direction is present. When the flag FL3 is "0", it indicates that the pan operation due to the shift shake in the X direction is absent.

The adjuster 18 sets the operation system of the first shift shake operation part 12a, based on the flag FL3. When the flag FL3 is set to 0, the adjuster 18 sets the operation system of the first shift shake operation part 12a to the first operation system. When the flag FL3 is set to 1, the adjuster 18 sets the operation system of the first shift shake operation part 12a to the second operation system.

The pan/tilt detector 17 detects the presence or absence of a tilt operation due to a shift shake in the Y direction on the basis of the shift shake amount YD in the Y direction calculated by the second shift shake operation part 12b. The pan/tilt detector 17 sets a flag FL4 indicative of the presence or absence of the tilt operation due to the shift shake in the Y direction. When the flag FL4 is "1", it indicates that the tilt operation due to the shift shake in the Y direction is present. When the flag FL4 is "0", it indicates that the tilt operation due to the shift shake in the Y direction is absent.

The adjuster 18 sets the operation system of the second shift shake operation part 12b, based on the flag FL4. When the flag FL4 is set to 0, the adjuster 18 sets the operation system of the second shift shake operation part 12b to the first operation system. When the flag FL4 is set to 1, the adjuster 18 sets the operation system of the second shift shake operation part 12b to the second operation system.

Figure 8:
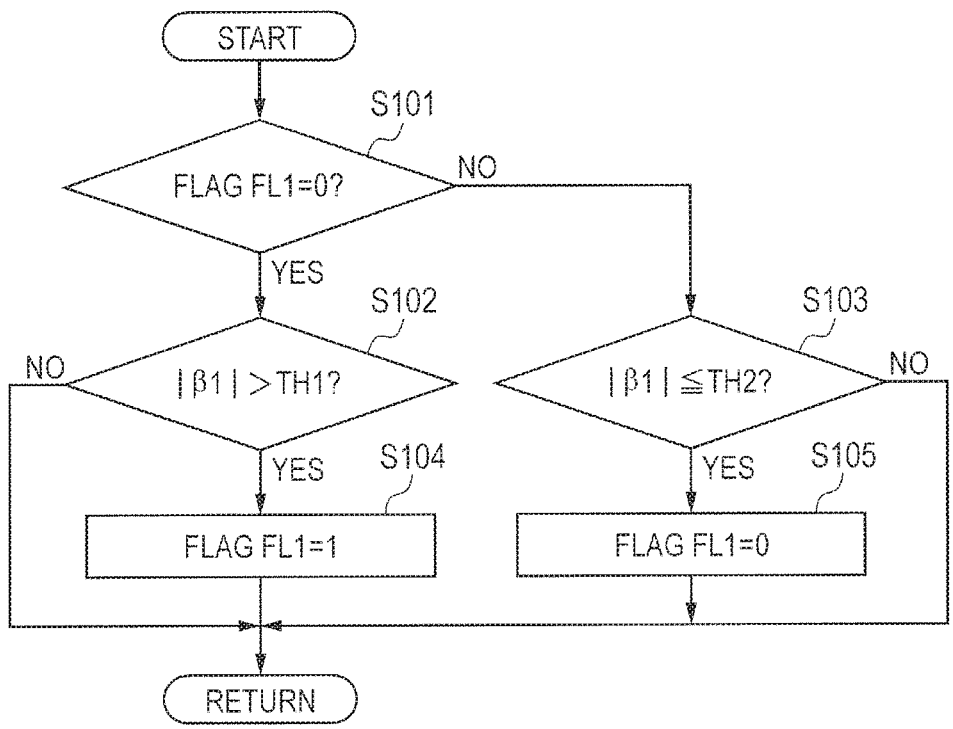
FIG. 8 is a flowchart showing a procedure of detecting a tilt operation (setting a flag FL1) due to an angular shake in a pitch direction, of the imaging apparatus 1030 according to the third embodiment.

FIG. 8 is a flowchart showing a procedure of detecting (setting the flag FL1) the tilt operation due to the angular shake in the pitch direction of the imaging apparatus 1030 according to the third embodiment.

In Step S101, when the flag FL1 is "0" (Step S101: YES), the processing proceeds to Step S102. When the flag FL1 is "1" (Step S101: NO), the processing proceeds to Step S103.

In Step S102, when the magnitude (absolute value) of the angular shake amount β1 in the pitch direction exceeds an adjustment start threshold value TH1 (S102: YES), the processing proceeds to Step S104. When the magnitude (absolute value) of the angular shake amount β1 in the pitch direction is not greater than the adjustment start threshold value TH1 (S102: NO), the processing is returned.

Here, the adjustment start threshold value TH1 can be made to be a correction limit THY of a correctable angle in the pitch direction of the corrective lens 92. Alternatively, the adjustment start threshold value TH1 may be set by the correction limit THY and the coefficients K3 and K4 in the equation (4).

In Step S104, the pan/tilt detector 17 sets the flag FL1 to "1" Thereafter, the processing is returned.

In Step S103, when the magnitude of the angular shake amount β1 in the pitch direction is less than or equal to an adjustment end threshold value TH2 (S103: YES), the processing proceeds to Step S105. When the magnitude (absolute value) of the angular shake amount β1 in the pitch direction exceeds the adjustment end threshold value TH2 (S103: NO), the processing is returned.

In Step S105, the pan/tilt detector 17 sets the flag FL1 to "0". Thereafter, the processing is returned.

A procedure of detecting (setting a flag FL2) a pan operation due to an angular shake in the yaw direction of the imaging apparatus 1030, a procedure of detecting (setting a flag FL3) a pan operation due to a shift shake in the X direction of the imaging apparatus 1030, and a procedure of detecting a tilt operation (flag FL4) due to a shift shake in the Y direction of the imaging apparatus 1030 are also similar to the procedure of the flowchart in FIG. 8.

Here, upon setting the flag FL2, the adjustment start threshold value TH1 can be made to be a correction limit THX of a correctable angle in the yaw direction of the corrective lens 92. Alternatively, the adjustment start threshold value TH1 may be set by the correction limit THX and the coefficients K1 and K2 in the equation (3).

The flag FL3 may be set based on the magnitude of the angular shake amount α2 obtained by angle-converting the shift shake amount XD in the X direction. When the flag FL3 is set, the adjustment start threshold value TH1 can be made to be a correction limit THX of a correctable angle in the yaw direction of the corrective lens 92. Alternatively, the adjustment start threshold value TH1 may be set by the correction limit THX and the coefficients K1 and K2 in the equation (3).

The flag FL4 may be set based on the magnitude of the angular shake amount β2 obtained by angle-converting the shift shake amount YD in the Y direction. When the flag FL3 is set, the adjustment start threshold value TH1 can be made to be a correction limit THY of a correctable angle in the pitch direction of the corrective lens 92. Alternatively, the adjustment start threshold value TH1 may be set by the correction limit THY and the coefficients K3 and K4 in the equation (4).

Figure 9:
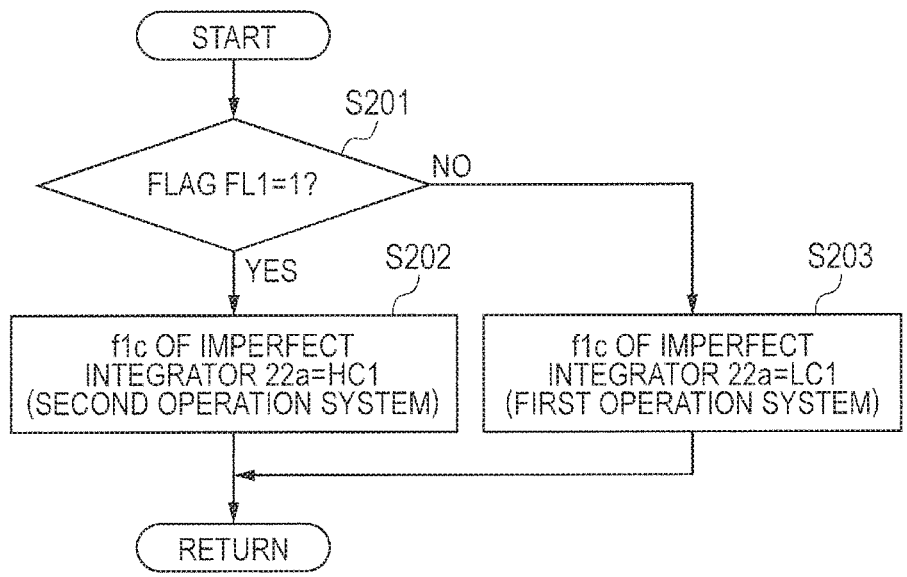
FIG. 9 is a flowchart showing a procedure of setting an operation system of a first angular shake operation part 11a in the third embodiment.

FIG. 9 is a flowchart showing a procedure of setting the operation system of the first angular shake operation part 11a in the third embodiment.

In Step S201, when the flag FL1 is "1" (S201: YES), the processing proceeds to Step S202. When the flag FL1 is "0" (S201: NO), the processing proceeds to Step S203.

In Step S202, the adjuster 18 sets the operation system of the first angular shake operation part 11a to the second operation system. That is, the adjuster 18 sets the cut-off frequency of the imperfect integrator 22a to HC1.

In Step S203, the adjuster 18 sets the operation system of the first angular shake operation part 11a to the first operation system. That is, the adjuster 18 sets the cut-off frequency of the imperfect integrator 22a to LC1.

A procedure of setting the operation system of the second angular shake operation part 11b, a procedure of setting the operation system of the first shift shake operation part 12a, and a procedure of setting the operation system of the second shift shake operation part 12b are similar to the procedure of the flowchart in FIG. 9. However, the operation system of the second angular shake operation part 11b is set based on the flag FL2, the operation system of the first shift shake operation part 12a is set based on the flag FL3, and the operation system of the second shift shake operation part 12b is set based on the flag FL4.

Figure 10A:
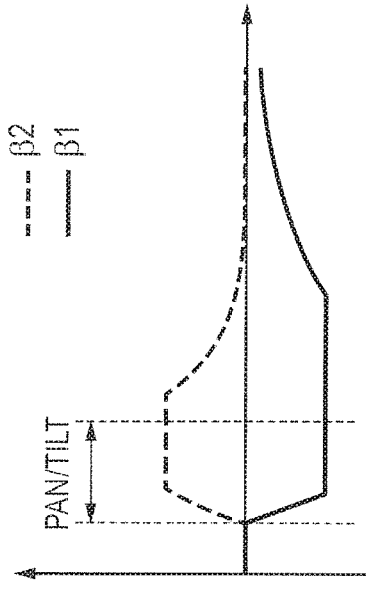
FIG. 10A is a diagram showing one example of an angular shake amount $\alpha 1$ in a yaw direction outputted from an imperfect integrator 22b and an angular shake amount $\alpha 2$ obtained by angle-converting a shift shake amount XD outputted from an imperfect integrator 25a, FIG. 10B is a diagram showing a first combined angular shake amount $\alpha$ obtained by combining the angular shake amount $\alpha 1$ and the angular shake amount $\alpha 2$.

FIG. 10A is a diagram showing one example of an angular shake amount α1 in the yaw direction outputted from the imperfect integrator 22b and an angular shake amount α2 obtained by angle-converting the shift shake amount XD outputted from the imperfect integrator 25a. In FIG. 10A, the cut-off frequency fc2 of the imperfect integrator 22b is fixed to LC2, and the cut-off frequency fc3 of the imperfect integrator 25a is fixed to LC3.

Figure 10C:
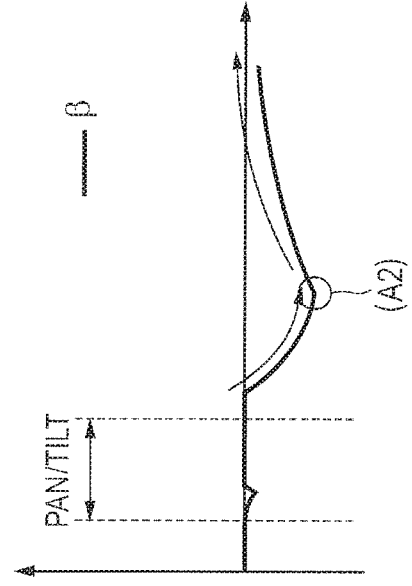
FIG. 10C is a diagram showing one example of an angular shake amount $\beta 1$ in a pitch direction outputted from an imperfect integrator 22a, and an angular shake amount $\beta 2$ obtained by angle-converting a shift shake amount YD outputted from an imperfect integrator 25b.
Figure 10B:
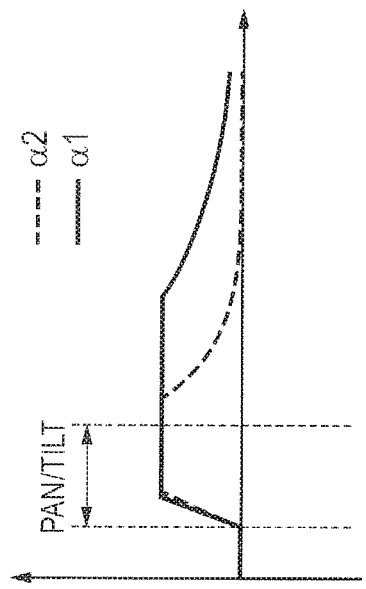
FIG. 10D is a diagram showing a second combined angular shake amount $\beta 3$ obtained by combining the angular shake amount $\beta 1$ and the angular shake amount $\beta 2$.

FIG. 10B is a diagram showing a first combined angular shake amount α obtained by combining an angular shake amount α1 and an angular shake amount α2. As indicated by (A1) in FIG. 10B, an inflection point occurs in the first combined angular shake amount α after the occurrence of a pan or tilt. Thus, since an image in which a subject further moves after the subject is temporarily stopped is observed, unpleasant impression may be given to the user.

FIG. 10C is a diagram showing one example of an angular shake amount β1 in the pitch direction outputted from the imperfect integrator 22a, and an angular shake amount β2 obtained by angle-converting a shift shake amount YD outputted from the imperfect integrator 25b. In FIG. 10C, the cut-off frequency fc1 of the imperfect integrator 22a is fixed to LC1, and the cut-off frequency fc4 of the imperfect integrator 25b is fixed to LC4.

Figure 10D:
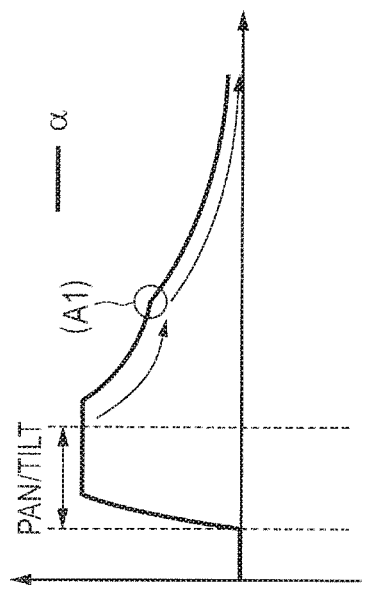

FIG. 10D is a diagram showing a second combined angular shake amount β obtained by combining the angular shake amount β1 and the angular shake amount β2. As indicated by (A2) in FIG. 10D, an inflection point occurs in the second combined angular shake amount β after the occurrence of a pan or tilt. Thus, since an image in which a subject further moves after the subject is temporarily stopped is observed, unpleasant impression may be given to the user.

Figure 11A:
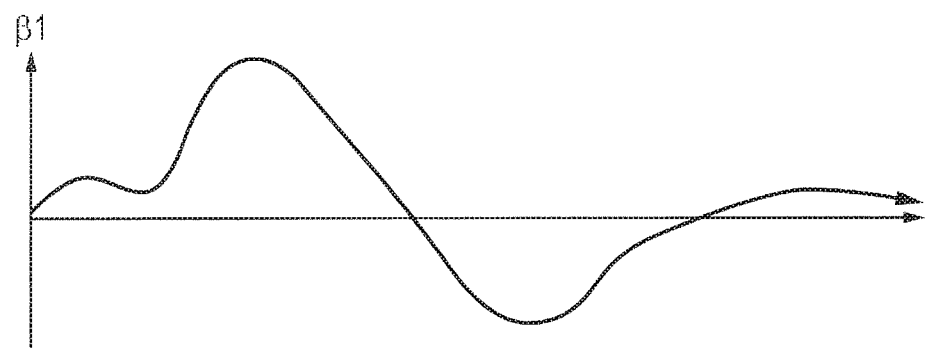
FIG. 11A is a diagram showing an angular shake amount $\beta 1$ in a pitch direction outputted from the imperfect integrator 22a where a cut-off frequency fc1 of the imperfect integrator 22a is fixed to LC1.

FIG. 11A is a diagram showing an angular shake amount β1 in the pitch direction outputted from the imperfect integrator 22a where the cut-off frequency fc1 of the imperfect integrator 22a is fixed to LC1.

Figure 11B:
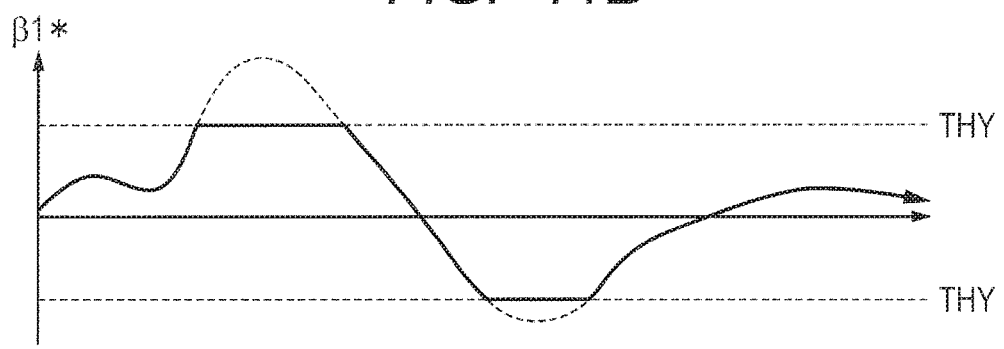
FIG. 11B is a diagram showing an angle $\beta 1^*$ corrected by a corrective lens 92, based on the angular shake amount $\beta 1$ in FIG. 11A.

FIG. 11B is a diagram showing an angle (hereinafter called an angle correction amount) β1* corrected by the corrective lens 92, based on the angular shake amount β1 in FIG. 11A. Although the angle correction amount β1 becomes opposite in sign to the angular shake amount β1 (i.e., it becomes reverse) in fact, they will be described herein as having the same sign (same direction) for convenience of explanation.

An adjustable limit (hereinafter called a correction limit) exists in the corrective lens 92 due to the limit of a movable range of the correction actuator 72. Here, it is assumed that it is not possible to correct an angle in the pitch direction, which is larger than the angle THY. Thus, when the angular shake amount β1 exceeds the correction limit THY, the angle correction amount β1* is fixed to the correction limit THY.

The same applies to an angle correction amount β2, an angle correction amount α1, and an angle correction amount α2 too. It is considered that the inflection points occur in the combined angular shake amounts α and β due to such operations as shown in FIGS. 10B and 10D. Thus, there is a case in which such an image as to give unpleasant impression to the user is generated.

Figure 11C:
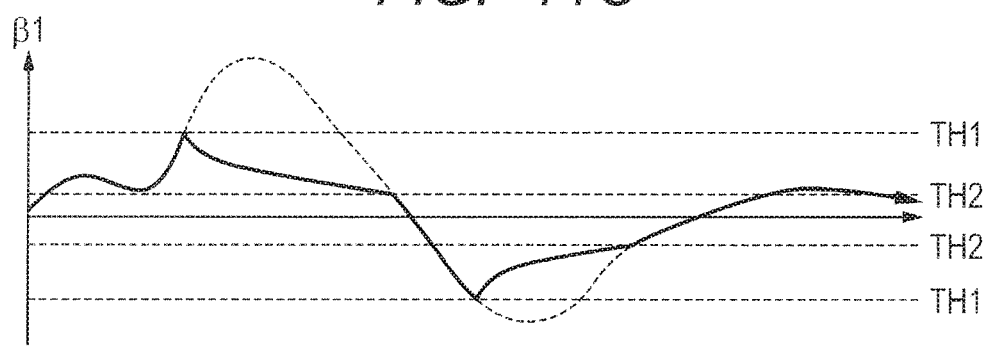
FIG. 11C is a diagram showing an angular shake amount $\beta 1$ in the pitch direction outputted from the imperfect integrator 22a in the third embodiment.

FIG. 11C is a diagram showing an angular shake amount β1 in the pitch direction outputted from the imperfect integrator 22a in the third embodiment.

Here, the adjustment start threshold value TH1 is assumed to be set to the correction limit THY. Alternatively, the adjustment start threshold value TH1 may be set by the correction limit THY and the coefficients K3 and K4 in the equation (4).

After start-up, the cut-off frequency fc1 of the imperfect integrator 22a is set to LC1 while the magnitude of the angular shake amount β1 in the pitch direction is not greater than the adjustment start threshold value TH1. When the magnitude of the angular shake amount β1 in the pitch direction exceeds the adjustment start threshold value TH1, the cut-off frequency fc1 of the imperfect integrator 22a is set to HC1. Thereafter, when the magnitude of the angular shake amount β1 in the pitch direction is lowered to the adjustment end threshold value TH2 or less, the cut-off frequency fc1 of the imperfect integrator 22a is set to LC1. Thereafter, when the magnitude of the angular shake amount β1 in the pitch direction exceeds the adjustment start threshold value TH1, the cut-off frequency fc1 of the imperfect integrator 22a is set to HC1.

Thus, by adjusting the cut-off frequency fc1 of the imperfect integrator 22a, based on the magnitude of the angular shake amount pi in the pitch direction outputted from the imperfect integrator 22a, the angular shake amount β1 in the pitch direction outputted from the imperfect integrator 22a can smoothly be restored to a correctable shake amount.

The same applies to an angular shake amount β2, an angular shake amount α1, and an angular shake amount α2 too. It is possible to avoid by such adjustment, such a problem as to cause the inflection point in each of the combined angular shake amounts α and β.

As described above, according to the present embodiment, it is possible to avoid by adjusting the cut-off frequency of the imperfect integrator upon the four-axis camera shake correction, a state in which an image wherein the subject further moves after the subject is temporarily stopped is observed, so that unpleasant impression is given to the user.

Incidentally, although the cut-off frequencies of the imperfect integrators 22a, 22b, 25a, and 25b have been all adjusted in the above embodiments, such an image as to give the unpleasant impression can be prevented from being generated as compared with the non-adjustment of the cut-off frequencies of all the imperfect integrators by adjusting the cut-off frequency of at least one of these imperfect integrators.

Fourth Embodiment

In the present embodiment, each flag is set based on a combined angular shake amount, and the operation systems of two shake operation parts are set based on one flag.

FIG. 12 is a diagram showing the relation of a flag, information identified by the flag, reference data referred to for setting the flag, and an operation system set by the flag in the fourth embodiment.

A pan/tilt detector 17 detects a tilt operation of an imaging apparatus 1030 on the basis of the magnitude (absolute value) of a second combined angular shake amount β. The pan/tilt detector 17 sets a flag FLP indicative of the presence or absence of the tilt operation. When the flag FLP is "1", it indicates that the tilt operation is present. When the flag FLP is "0", it indicates that the tilt operation is absent.

A procedure of setting the flag FLP by the pan/tilt detector 17 is similar to that shown in FIG. 8 except that a combined angular shake amount β is used in place of an angular shake amount pi. An adjustment start threshold value TH1 can be made to be a correction limit THY of a correctable angle in a pitch direction of a corrective lens 92.

An adjuster 18 sets the operation system of a first angular shake operation part 11a and the operation system of a second shift shake operation part 12b, based on the flag FLP. When the flag FLP is set to 0, the adjuster 18 sets the operation system of the first angular shake operation part 11a to a first operation system and sets the operation system of the second shift shake operation part 12b to the first operation system. When the flag FLP is set to 1, the adjuster 18 sets the operation system of the first angular shake operation part 11a to a second operation system and sets the operation system of the second shift shake operation part 12b to the second operation system.

The pan/tilt detector 17 detects the presence or absence of a pan operation of the imaging apparatus 1030 on the basis of the magnitude (absolute value) of a first combined angular shake amount α. The pan/tilt detector 17 sets a flag FLY indicative of the presence or absence of the pan operation. When the flag FLY is "1", it indicates that the pan operation is present. When the flag FLY is "0", it indicates that the pan operation is absent.

A procedure of setting the flag FLY by the pan/tilt detector 17 is similar to that shown in FIG. 8 except that a combined angular shake amount α is used in place of an angular shake amount α1. An adjustment start threshold value TH1 can be made to be a correction limit THX of a correctable angle in a yaw direction of the corrective lens 92.

The adjuster 18 sets the operation system of a second angular shake operation part 11b and the operation system of a first shift shake operation part 12a, based on the flag FLY. When the flag FLY is set to 0, the adjuster 18 sets the operation system of the second angular shake operation part 11b to the first operation system and sets the operation system of the first shift shake operation part 12a to the first operation system. When the flag FLY is set to 1, the adjuster 18 sets the operation system of the second angular shake operation part 11b to the second operation system and sets the operation system of the first shift shake operation part 12a to the second operation system.

Figure 13:
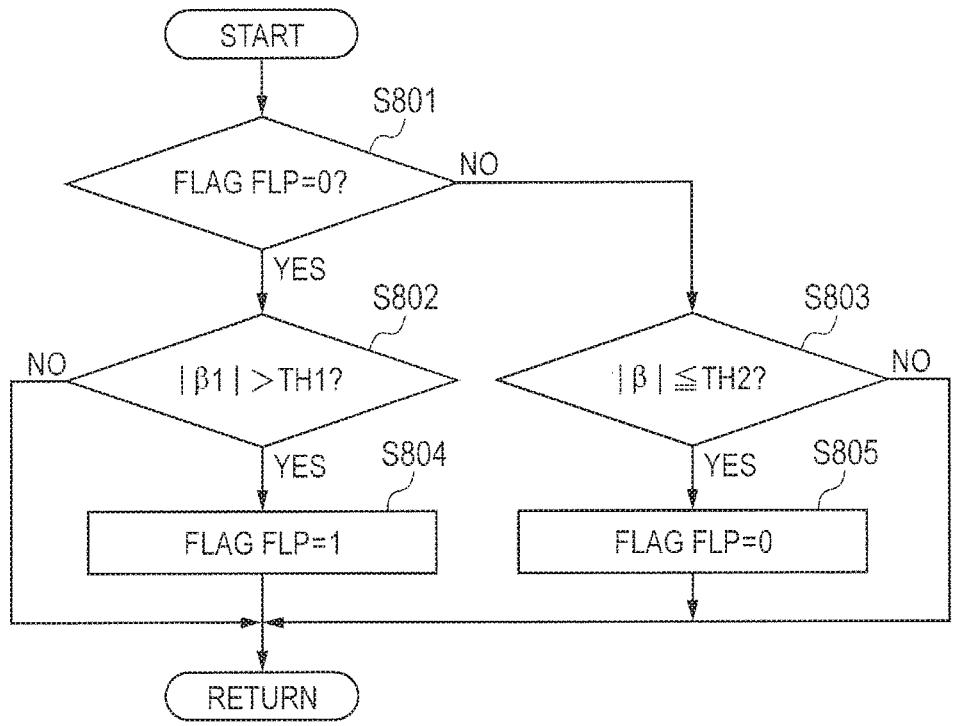
FIG. 13 is a flowchart showing a procedure of detecting setting a flag FLP) a tilt operation of an imaging apparatus 1030 according to the fourth embodiment.

FIG. 13 is a flowchart showing a procedure of detecting (setting the flag FLP) the tilt operation of the imaging apparatus 1030 according to the fourth embodiment.

In Step S801, when the flag FLP is "0" (Step S801: YES), the processing proceeds to Step S802. When the flag FLP is "1" (Step S801: NO), the processing proceeds to Step S803.

In Step S802, when the magnitude (absolute value) of the second combined angular shake amount β exceeds the adjustment start threshold value TH1 (S802: YES), the processing proceeds to Step S804. When the magnitude (absolute value) of the second combined angular shake amount β is not greater than the adjustment start threshold value TH1 (S802: NO), the processing is returned.

In Step S804, the pan/tilt detector 17 sets the flag FLP to "1". Thereafter, the processing is returned.

In Step S803, when the magnitude (absolute value) of the second combined angular shake amount β is less than or equal to an adjustment end threshold value TH2 (S803: YES), the processing proceeds to Step S805. When the magnitude (absolute value) of the second combined angular shake amount β exceeds the adjustment end threshold value TH2 (S803: NO), the processing is returned.

In Step S805, the pan/tilt detector 17 sets the flag FLP to "0". Thereafter, the processing is returned.

A procedure of detecting (setting the flag FLY) the pan operation of the imaging apparatus 1030 is also similar to the procedure of the flowchart in FIG. 13. However, the threshold values TH1 and TH2 may be made different from each other.

Figure 14:
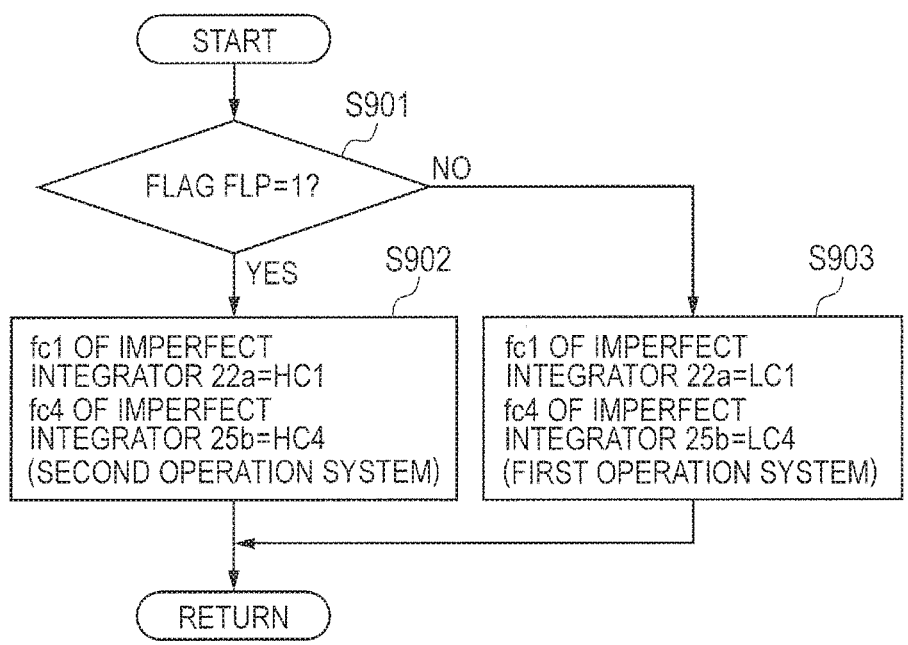
FIG. 14 is a flowchart showing a procedure of setting operation systems of a first angular shake operation part 11a and a second shift shake operation part 12b in the fourth embodiment.

FIG. 14 is a flowchart showing a procedure of setting the operation systems of the first angular shake operation part 11a and the second shift shake operation part 12b in the fourth embodiment.

In Step S901, when the flag FLP is "1" (S901: YES), the processing proceeds to Step S902. When the flag FLP is "0" (S901: NO), the processing proceeds to Step S903.

In Step S902, the adjuster 18 sets the operation system of the first angular shake operation part 11a to the second operation system. That is, the adjuster 18 sets a cut-off frequency fc1 of an imperfect integrator 22a to HC1. The adjuster 18 sets the operation system of the second shift shake operation part 12b to the second operation system. That is, the adjuster 18 sets a cut-off frequency fc4 of an imperfect integrator 25b to HC4.

In Step S903, the adjuster 18 sets the operation system of the first angular shake operation part 11a to the first operation system. That is, the adjuster 18 sets the cut-off frequency fc1 of the imperfect integrator 22a to LC1. The adjuster 18 sets the operation system of the second shift shake operation part 12b to the first operation system. That is, the adjuster 18 sets the cut-off frequency fc4 of the imperfect integrator 25b to LC4.

A procedure of setting the operation systems of the second angular shake operation part lib and the first shift shake operation part 12a is also similar to the procedure of the flowchart in FIG. 14. The operation systems of the second angular shake operation part 11b and the first shift shake operation part 12a are set based on the flag FLY.

As described above, according to the present embodiment, the operation systems of the first angular shake operation part 11a and the second shift shake operation part 12b both determining the shake in the pitch direction are set based on the combined angular shake amount β in the pitch direction. The operation systems of the second angular shake operation part 11b and the first shift shake operation part 12a both determining the shake in the yaw direction are set based on the combined angular shake amount α in the yaw direction.

Incidentally, the operation systems of the four shake operation parts 11a, 11b, 12a, and 12b may be set using the shake amount obtained by combing the combined angular shake amount β in the pitch direction and the combined angular shake amount in the yaw direction.

Fifth Embodiment

Figure 15:
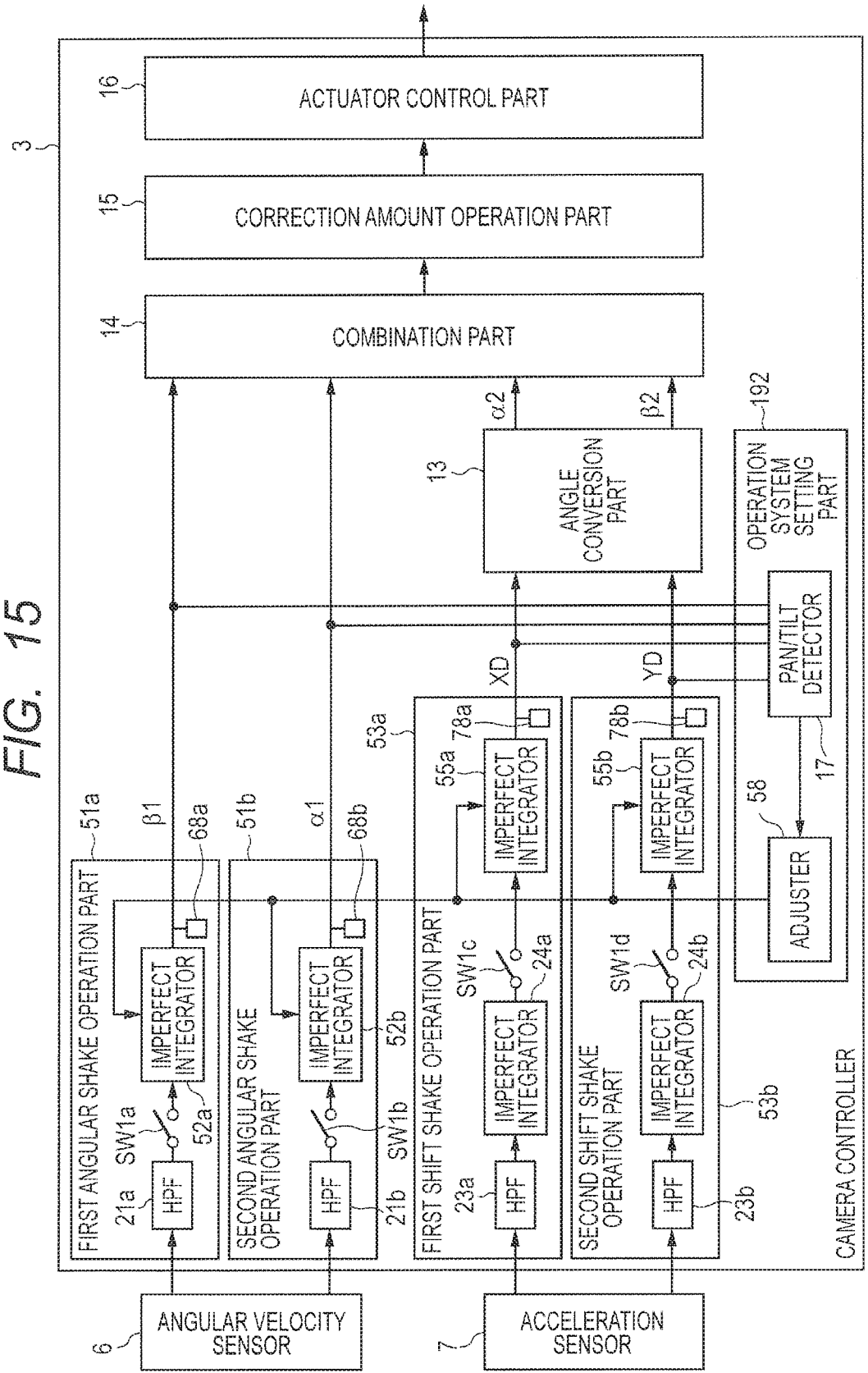
FIG. 15 is a diagram showing the configuration of a camera controller 3 according to a fifth embodiment.

FIG. 15 is a diagram showing the configuration of a camera controller 3 according to a fifth embodiment.

The camera controller 3 according to the fifth embodiment is different from the camera controller 2 according to the third embodiment in that the camera controller 3 is equipped with a first angular shake operation part 51a, a second angular shake operation part 51b, a first shift shake operation part 53a, a second shift shake operation part 53b, and an operation system setting part 192 different from those in the camera controller 2.

The operation system setting part 192 is equipped with an adjuster 58, and a pan/tilt detector 17 similar to that in the third embodiment.

The first angular shake operation part 51a is equipped with a switch SW1a, a high-pass filter 21a, an imperfect integrator 52a, and a memory 68a.

The adjuster 58 sets the switch SW1a to on where the operation system of the first angular shake operation part 51a is set to a first operation system. The adjuster 58 sets the switch SW1a to off where the operation system of the first angular shake operation part 51a is set to a second operation system.

As with the third embodiment, the high-pass filter 21a removes an offset of a signal indicative of the angular velocity of a shake in a pitch direction, which is outputted from an angular velocity sensor 6.

When the switch SW1a is on, the signal indicative of the angular velocity of the shake in the pitch direction from which the offset is removed, the signal being outputted from the high-pass filter 21a, is transmitted to the imperfect integrator 52a. When the switch SW1a is off, the signal indicative of the angular velocity of the shake in the pitch direction from which the offset is removed, the signal being outputted from the high-pass filter 21a, is not transmitted to the imperfect integrator 52a.

The imperfect integrator 52a inputs therein the angular velocity of the shake in the pitch direction from which the offset is removed, and outputs an angular shake amount β1 in the pitch direction.

When the operation system of the first angular shake operation part 51a is set to the first operation system, the adjuster 58 causes the imperfect integrator 52a to execute an integral operation of the angular velocity of the shake in the pitch direction. When the operation system of the first angular shake operation part 51a is set to the second operation system, the adjuster 58 causes the imperfect integrator 52a to stop its integral operation.

The memory 68a stores the latest output value of the imperfect integrator 52a therein. That is, the output value of the imperfect integrator 52a stored in the memory 68a is updated into the latest output value. When the operation system of the first angular shake operation part 51a is set to the second operation system, the memory 68a stores therein an output value immediately before the stop of the imperfect integrator 52a. When the operation system of the first angular shake operation part 51a is set to the second operation system, the adjuster 58 monotonously decreases with time, the output value immediately before the stop of the imperfect integrator 52a, which is stored in the memory 68a, and causes the imperfect integrator 52a to output the same as the angular shake amount β1 in the pitch direction.

The second angular shake operation part 51b is equipped with a switch SW1b, a high-pass filter 21b, an imperfect integrator 52b, and a memory 68b.

When the operation system of the second angular shake operation part 51b is set to the first operation system, the adjuster 58 sets the switch SW1b to on. When the operation system of the second angular shake operation part 51b is set to the second operation system, the adjuster 58 sets the switch SW1b to off.

As with the third embodiment, the high-pass filter 21b removes an offset of a signal indicative of the angular velocity of a shake in a yaw direction, which is outputted from an angular velocity sensor 6.

When the switch SW1b is on, the signal indicative of the angular velocity of the shake in the yaw direction from which the offset is removed, the signal being outputted from the high-pass filter 21b, is transmitted to the imperfect integrator 52b. When the switch SW1b is off, the signal indicative of the angular velocity of the shake in the yaw direction from which the offset is removed, the signal being outputted from the high-pass filter 21b, is not transmitted to the imperfect integrator 52b.

The imperfect integrator 52b inputs therein the angular velocity of the shake in the yaw direction from which the offset is removed, and outputs an angular shake amount α1 in the yaw direction.

When the operation system of the second angular shake operation part 51b is set to the first operation system, the adjuster 58 causes the imperfect integrator 52b to execute an integral operation of the angular velocity of the shake in the yaw direction. When the operation system of the second angular shake operation part 51b is set to the second operation system, the adjuster 58 causes the imperfect integrator 52b to stop its integral operation.

The memory 68b stores the latest output value of the imperfect integrator 52b therein. When the operation system of the second angular shake operation part 51b is set to the second operation system, the memory 68b stores therein an output value immediately before the stop of the imperfect integrator 52b. When the operation system of the second angular shake operation part 51b is set to the second operation system, the adjuster 58 monotonously decreases with time, the output value immediately before the stop of the imperfect integrator 52b, which is stored in the memory 68b, and causes the imperfect integrator 52b to output the same as an angular shake amount α1 in the yaw direction.

The first shift shake operation part 53a is equipped with a switch SW1c, a high-pass filter 23a, imperfect integrators 24a and 55a, and a memory 78a.

When the operation system of the first shift shake operation part 53a is set to the first operation system, the adjuster 58 sets the switch SW1c to on. When the operation system of the first shift shake operation part 53a is set to the second operation system, the adjuster 58 sets the switch SW1c to off.

The high-pass filter 23a removes an offset of a signal indicative of the acceleration of a shake in an X direction, which is outputted from an acceleration sensor 7.

The imperfect integrator 24a inputs therein the acceleration of the shake in the X direction from which the offset is removed, and integrates the acceleration of the shake in the X direction to thereby output the velocity of the shake in the X direction.

When the switch SW1c is on, a signal indicative of the velocity of the shake in the X direction, which is outputted from the imperfect integrator 24a is transmitted to the imperfect integrator 55a. When the switch SW1c is off, the signal indicative of the velocity of the shake in the X direction, which is outputted from the imperfect integrator 24a is not transmitted to the imperfect integrator 55a.

The imperfect integrator 55a inputs therein the velocity of the shake in the X direction and outputs a shift shake amount XD in the X direction.

When the operation system of the first shift shake operation part 53a is set to the first operation system, the adjuster 58 causes the imperfect integrator 55a to execute an integral operation of the velocity of the shake in the X direction. When the operation system of the first shift shake operation part 53a is set to the second operation system, the adjuster 58 causes the imperfect integrator 55a to stop its integral operation.

The memory 78a stores the latest output value of the imperfect integrator 55a therein. When the operation system of the first shift shake operation part 53a is set to the second operation system, the memory 78a stores therein an output value immediately before the stop of the imperfect integrator 55a. When the operation system of the first shift shake operation part 53a is set to the second operation system, the adjuster 58 monotonously decreases with time, the output value immediately before the stop of the imperfect integrator 55a, which is stored in the memory 78a, and causes the imperfect integrator 55a to output the same as the shift shake amount XD in the X direction.

The second shift shake operation part 53b is equipped with a switch SW1d, a high-pass filter 23b, imperfect integrators 24b and 55b, and a memory 78b.

When the operation system of the second shift shake operation part 53b is set to the first operation system, the adjuster 58 sets the switch SW1d to on. When the operation system of the second shift shake operation part 53b is set to the second operation system, the adjuster 58 sets the switch SW1d to off.

The high-pass filter 23b removes an offset of a signal indicative of the acceleration of a shake in a Y direction, which is outputted from the acceleration sensor 7.

The imperfect integrator 24b inputs therein the acceleration of the shake in the Y direction from which the offset is removed, and integrates the acceleration of the shake in the Y direction to thereby output the velocity of the shake in the Y direction.

When the switch SW1d is on, a signal indicative of the velocity of the shake in the Y direction, which is outputted from the imperfect integrator 24b is transmitted to the imperfect integrator 55b. When the switch SW1d is off, the signal indicative of the velocity of the shake in the Y direction, which is outputted from the imperfect integrator 24b is not transmitted to the imperfect integrator 55b.

The imperfect integrator 55b inputs therein the velocity of the shake in the Y direction and outputs a shift shake amount YD in the Y direction.

When the operation system of the second shift shake operation part 53b is set to the first operation system, the adjuster 58 causes the imperfect integrator 55b to execute an integral operation of the velocity of the shake in the Y direction. When the operation system of the second shift shake operation part 53b is set to the second operation system, the adjuster 58 causes the imperfect integrator 55b to stop its integral operation.

The memory 78b stores the latest output value of the imperfect integrator 55b therein. When the operation system of the second shift shake operation part 53b is set to the second operation system, the memory 78b stores therein an output value immediately before the stop of the imperfect integrator 55b. When the operation system of the second shift shake operation part 53b is set to the second operation system, the adjuster 58 monotonously decreases with time, the output value immediately before the stop of the imperfect integrator 55b, which is stored in the memory 78b, and causes the imperfect integrator 55b to output the same as the shift shake amount YD in the Y direction.

Figure 16:
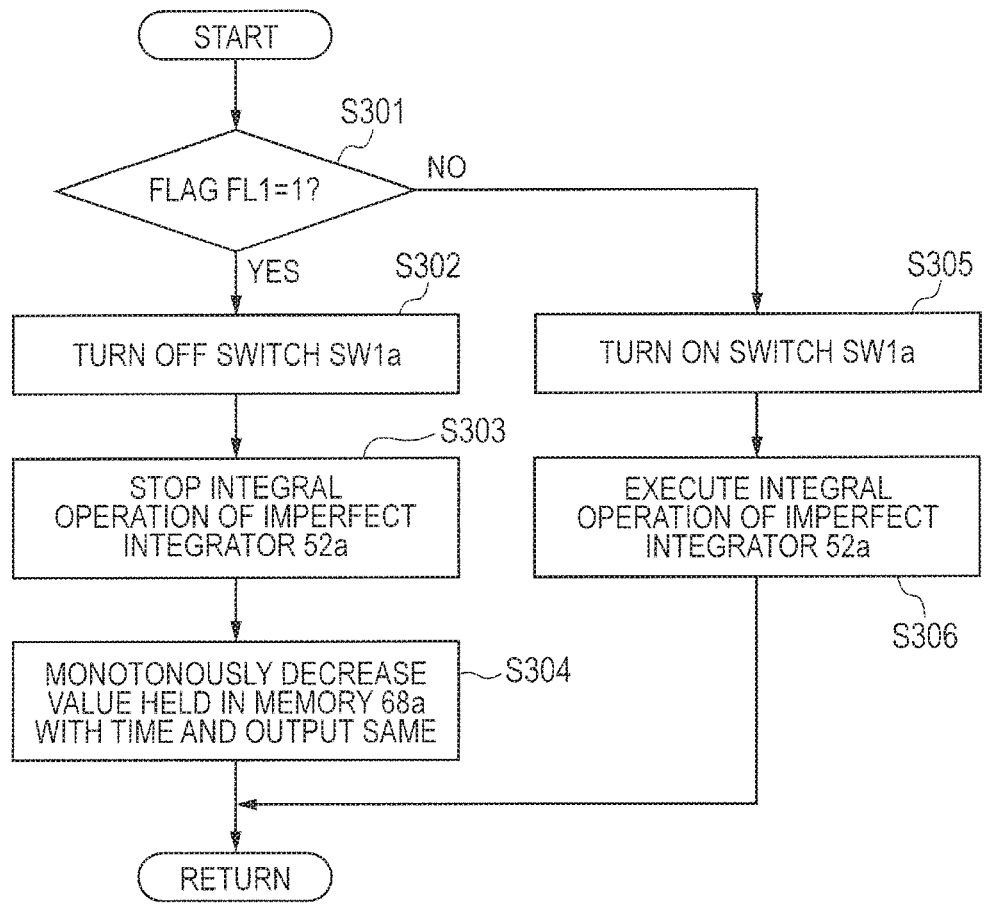
FIG. 16 is a flowchart showing a procedure of setting an operation system of a first angular shake operation part 11a in the fifth embodiment.

FIG. 16 is a flowchart showing a procedure of setting the operation system of the first angular shake operation part 51a in the fifth embodiment.

In Step S301, when a flag FL1 is "1" (S301: YES), the processing proceeds to Step S302. When the flag FL1 is "0" (S301: NO), the processing proceeds to Step S305.

In Steps S302, S303, and S304, the operation system of the first angular shake operation part 51a is set to the second operation system.

In Step S302, the adjuster 58 turns off the switch SW1a.

In Step S303, the adjuster 58 causes the imperfect integrator 52a to execute an integral operation for stopping the integral operation of the imperfect integrator 52a.

In Step S304, the adjuster 58 monotonously decreases with time, the output value immediately before the stop of the imperfect integrator 52a, which is stored in the memory 68a, and causes the imperfect integrator 52a to output the same as the angular shake amount β1 in the pitch direction.

In Steps S305 and S306, the operation system of the first angular shake operation part 51a is set to the first operation system.

In Step S305, the adjuster 58 turns on the switch SW1a.

In Step S306, the adjuster 58 causes the imperfect integrator 52a to execute the integral operation thereof.

A procedure of setting the operation system of the second angular shake operation part 51b, a procedure of setting the operation system of the first shift shake operation part 53a, and a procedure of setting the operation system of the second shift shake operation part 53b are similar to the procedure of the flowchart in FIG. 16. However, the operation system of the second angular shake operation part 51b is set based on a flag FL2. The operation system of the first shift shake operation part 53a is set based on a flag FL3, and the operation system of the second shift shake operation part 53b is set based on a flag FL4.

Figure 17A:
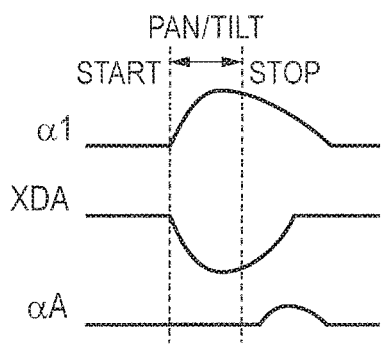
FIG. 17A is a diagram showing an angular shake amount $\alpha 1$ in a yaw direction outputted from an imperfect integrator 22b in the fifth embodiment, a shift shake amount XDA outputted from a conventional imperfect integrator 25a, and a conventional first combined angular shake amount $\alpha A$.

FIG. 17A is a diagram showing the angular shake amount α1 in the yaw direction outputted from the conventional imperfect integrator 22b, the shift shake amount XDA outputted from the conventional imperfect integrator 25a, and the conventional first combined angular shake amount αA. The conventional imperfect integrator 25a executes an integral operation even when a pan or tilt is detected. The first combined angular shake amount αA is an amount obtained by combining an angular shake amount α2A obtained by angle-converting the shift shake amount XD and an angular shake amount α1.

As indicated by the first combined angular shake amount αA in FIG. 17A, an image in which a subject is moved and returned is observed upon its actual photography after the occurrence of the pan or tilt.

Figure 17B:
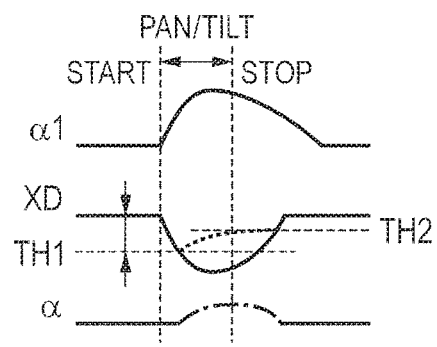
FIG. 17B is a diagram showing an angular shake amount $\alpha 1$ in a yaw direction outputted from the imperfect integrator 22b in the fifth embodiment, a shift shake amount XD outputted from an imperfect integrator 25a in the fifth embodiment, and a first combined angular shake amount $\alpha$.

FIG. 17B is a diagram showing an angular shake amount α1 in the yaw direction outputted from the imperfect integrator 52a in the fifth embodiment, a shift shake amount XD outputted from the imperfect integrator 55a in the fifth embodiment, and a first combined angular shake amount α.

The first combined angular shake amount α is an amount obtained by combining an angular shake amount α2 obtained by angle-converting the shift shake amount XD, and an angular shake amount α1.

When the shift shake amount XD in FIG. 17B exceeds an adjustment start threshold value TH1, the integral operation of the imperfect integrator 55a is stopped. A value obtained by monotonously decreasing an integrated value immediately before the stop of the imperfect integrator 55a is outputted as the shift shake amount XD until the shift shake amount XD is lowered to an adjustment end threshold value TH2.

As indicated by the first combined angular shake amount α in FIG. 17B, an image in which a subject is simply returned upon its actual photography after the occurrence of a pan or tilt is observed. It is thus possible to photograph a more natural image.

Figure 18A:
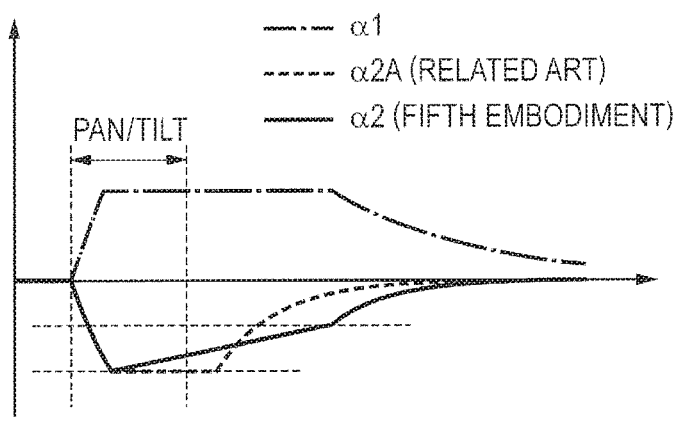
FIG. 18A is a diagram showing one example of an angular shake amount $\alpha 1$ in a yaw direction outputted from the imperfect integrator 22b, and angular shake amounts $\alpha 2A$ and α2 obtained by angle-converting shift shake amounts XDA and XD outputted from the imperfect integrator 25*a*.

FIG. 18A is a diagram showing one example of an angular shake amount α1 in the yaw direction outputted from the imperfect integrator 22b, and angular shake amounts α2A and α2 obtained by angle-converting shift shake amounts XDA and XD outputted from the imperfect integrator 25a.

The angular shake amount α2A is an angular shake amount in the conventional control, i.e., an angular shake amount where the imperfect integrator 25a executes an integral operation even when a pan or tilt is detected.

The angular shake amount α2 is an angular shake amount in the control of the fifth embodiment, i.e., an angular shake amount where when a pan or tilt is detected, the imperfect integrator 25a stops an integral operation and monotonously decreases an integrated value immediately before the stop of the integral operation and outputs the same.

Figure 18B:
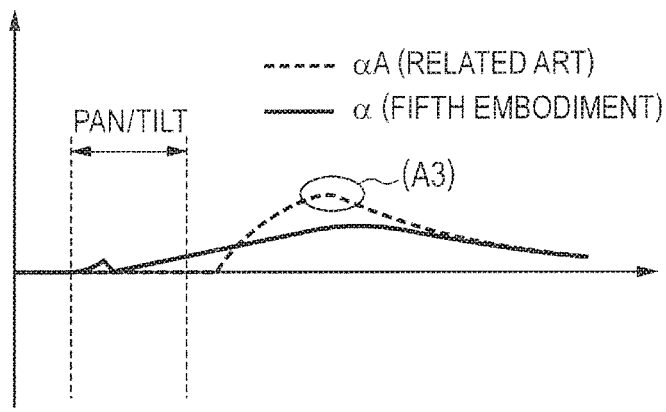
FIG. 18B is a diagram showing a conventional first combined angular shake amount αA obtained by combining an angular shake amount α1 and a conventional angular shake amount α2A, and a first combined angular shake amount α obtained by combining an angular shake amount α1 and an angular shake amount α2 in the fifth embodiment.

FIG. 18B is a diagram showing a conventional first combined angular shake amount αA obtained by combining an angular shake amount α1 and a conventional angular shake amount α2A, and a first combined angular shake amount α obtained by combining an angular shake amount α1 and an angular shake amount α2 in the fifth embodiment.

As indicated by (A3) in FIG. 18B, an inflection point occurs in the conventional first combined angular shake amount αA after the occurrence of the pan or tilt. Thus, since an image in which a subject further moves after the subject is temporarily stopped is observed, unpleasant impression may be given to a user. On the contrary, since no inflection point occurs in the first combined angular shake amount α in the fifth embodiment after occurrence of the pan or tilt, no unpleasant impression is given to the user.

In the present embodiment, the adjuster stops the input to the imperfect integrator and the operation of the imperfect integrator, and performs the direct operations such as a monotonous decrease in the stored value, etc. to thereby enable an improvement in the degree of freedom of a convergence adjustment.

Incidentally, although the switching of the operation system has been described as the switching of the cut-off frequency of the imperfect integrator in the present embodiment as with the third embodiment, the present embodiment is not limited to it. As with the fourth embodiment, the switching of the operation system may be made by the switching of execution of the integral operation of the imperfect integrator or the stop of the integral operation, and a monotonous decrease in the integrated value immediately before its stop.

Sixth Embodiment

Figure 19:
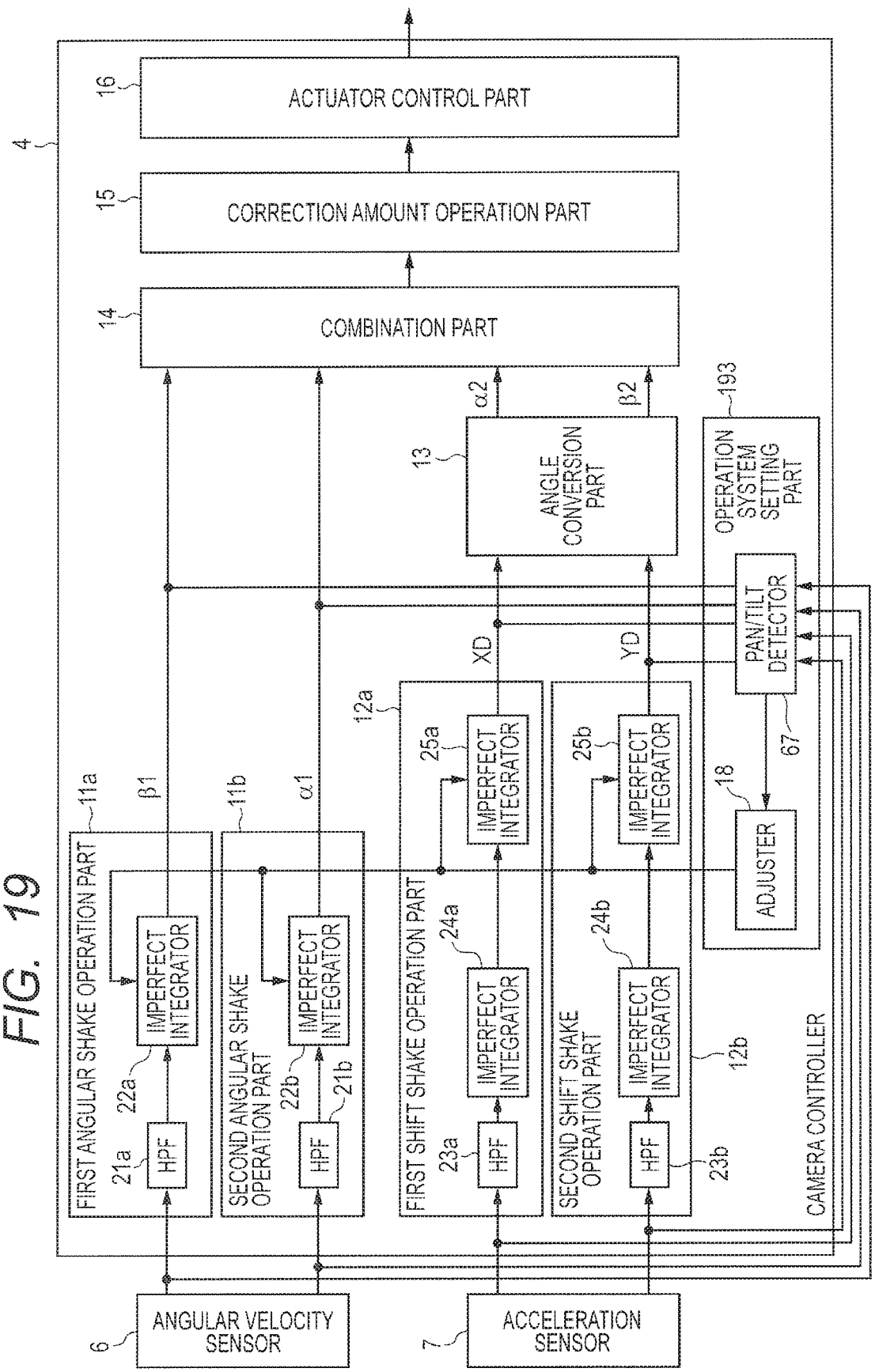
FIG. 19 is a diagram showing the configuration of a camera controller 4 according to a sixth embodiment.

FIG. 19 is a diagram showing the configuration of a camera controller 4 according to a sixth embodiment.

The camera controller 4 according to the sixth embodiment is different from the camera controller 2 according to the third embodiment in that the camera controller 4 is equipped with an operation system setting part 193 different from that in the third embodiment.

The operation system setting part 193 is equipped with a pan/tilt detector 67 and an adjuster 18 similar to that in the third embodiment.

FIG. 20 is a diagram showing the relation of a flag, information identified by the flag, reference data referred to for setting the flag, and an operation system set by the flag in the sixth embodiment.

The pan/tilt detector 67 detects the presence or absence of a tilt operation due to an angular shake in a pitch direction on the basis of an angular velocity in the pitch direction outputted from an angular velocity sensor 6, an acceleration in a Y direction outputted from an acceleration sensor 7, and an angular shake amount β1 in the pitch direction calculated by a first angular shake operation part 11a. The pan/tilt detector 67 sets a flag FL1 indicative of the presence or absence of the tilt operation due to the angular shake in the pitch direction. When the flag FL1 is "1", it indicates that the tilt operation due to the angular shake in the pitch direction is present. When the flag FL1 is "0", it indicates that the tilt operation due to the angular shake in the pitch direction is absent.

The adjuster 18 sets the operation system of the first angular shake operation part 11a, based on the flag FL1. When the flag FL1 is set to 0, the adjuster 18 sets the operation system of the first angular shake operation part 11a to a first operation system. When the flag FL1 is set to 1, the adjuster 18 sets the operation system of the first angular shake operation part 11a to a second operation system.

The pan/tilt detector 67 detects the presence or absence of a pan operation due to an angular shake in a yaw direction on the basis of an angular velocity in the yaw direction outputted from the angular velocity sensor 6, an acceleration in an X direction outputted from the acceleration sensor 7, and an angular shake amount α1 in the yaw direction calculated by a second angular shake operation part 11b. The pan/tilt detector 67 sets a flag FL2 indicative of the presence or absence of the pan operation due to the angular shake in the yaw direction. When the flag FL2 is "1", it indicates that the pan operation due to the angular shake in the yaw direction is present. When the flag FL2 is "0", it indicates that the pan operation due to the angular shake in the yaw direction is absent.

The adjuster 18 sets the operation system of the second angular shake operation part 11b, based on the flag FL2. When the flag FL2 is set to 0, the adjuster 18 sets the operation system of the second angular shake operation part 11b to the first operation system. When the flag FL2 is set to 1, the adjuster 18 sets the operation system of the second angular shake operation part 11b to the second operation system.

The pan/tilt detector 67 detects the presence or absence of a pan operation due to a shift shake in the X direction on the basis of the angular velocity in the yaw direction outputted from the angular velocity sensor 6, the acceleration in the X direction outputted from the acceleration sensor 7, and a shift shake amount XD in the X direction calculated by a first shift shake operation part 12a. The pan/tilt detector 67 sets a flag FL3 indicative of the presence or absence of the pan operation due to the shift shake in the X direction. When the flag FL3 is "1", it indicates that the pan operation due to the shift shake in the X direction is present. When the flag FL3 is "0", it indicates that the pan operation due to the shift shake in the X direction is absent.

The adjuster 18 sets the operation system of the first shift shake operation part 12a, based on the flag FL3. When the flag FL3 is set to 0, the adjuster 18 sets the operation system of the first shift shake operation part 12a to the first operation system. When the flag FL3 is set to 1, the adjuster 18 sets the operation system of the first shift shake operation part 12a to the second operation system.

The pan/tilt detector 67 detects the presence or absence of a tilt operation due to a shift shake in the Y direction on the basis of the angular velocity in the pitch direction outputted from the angular velocity sensor 6, the acceleration in the Y direction outputted from the acceleration sensor 7, and a shift shake amount YD in the Y direction calculated by a second shift shake operation part 12b. The pan/tilt detector 67 sets a flag FL4 indicative of the presence or absence of the tilt operation due to the shift shake in the Y direction. When the flag FL4 is "1", it indicates that the tilt operation due to the shift shake in the Y direction is present. When the flag FL4 is "0", it indicates that the tilt operation due to the shift shake in the Y direction is absent.

The adjuster 18 sets the operation system of the second shift shake operation part 12b, based on the flag FL4. When the flag FL4 is set to 0, the adjuster 18 sets the operation system of the second shift shake operation part 12b to the first operation system. When the flag FL4 is set to 1, the adjuster 18 sets the operation system of the second shift shake operation part 12b to the second operation system.

Figure 21:
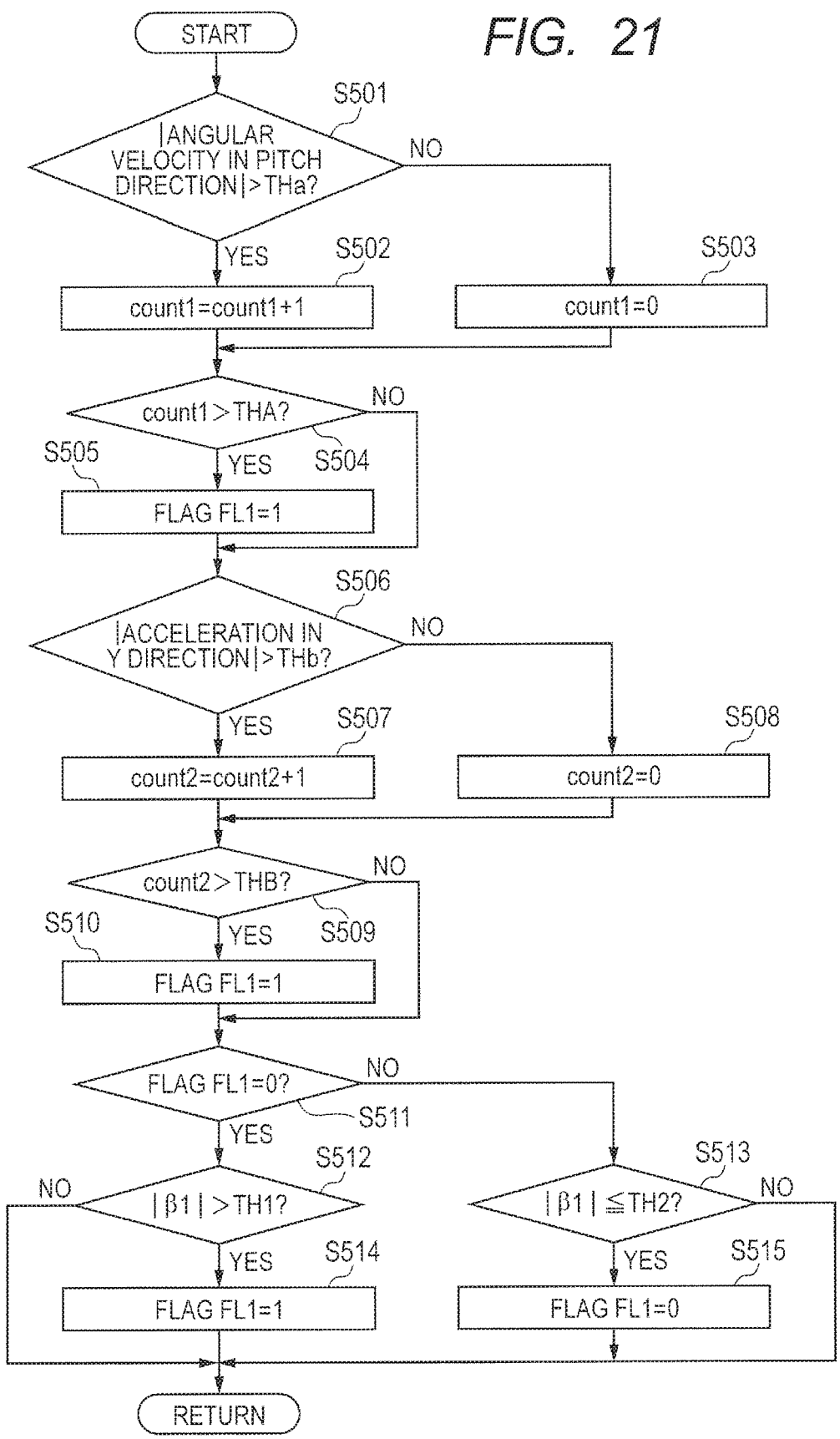
FIG. 21 is a flowchart showing a procedure of detecting (setting a flag FL1) a tilt operation due to an angular shake in a pitch direction, of an imaging apparatus 1030 in the sixth embodiment.

FIG. 21 is a flowchart showing a procedure of detecting (setting the flag FL1) the tilt operation due to the angular shake in the pitch direction of the imaging apparatus 1030 according to the sixth embodiment.

In Step S501, when the magnitude (absolute value) of the angular velocity in the pitch direction exceeds a threshold value THa (Step S501: YES), the processing proceeds to Step S502. When the magnitude (absolute value) of the angular velocity in the pitch direction is not greater than the threshold value Tha (S501: NO), the processing proceeds to Step S503.

In Step S502, the pan/tilt detector 67 increments a count value count1.

In Step S503, the pan/tilt detector 67 sets the count value count1 to "0".

In Step S504, when the count value count1 exceeds a threshold value THA (S504: YES), the processing proceeds to Step S505. When the count value count1 is not greater than the threshold value THA (S504: NO), the processing proceeds to Step S506. The count value count1 is provided to consider a variation in the magnitude (absolute value) of the angular velocity in the pitch direction due to noise.

In Step S505, the pan/tilt detector 67 sets the flag FL1 to "1". Thereafter, the processing proceeds to Step S506.

In Step S506, when the magnitude (absolute value) of the acceleration in the Y direction exceeds a threshold value Thb (S506: YES), the processing proceeds to Step S507. When the magnitude (absolute value) of the acceleration in the Y direction is not greater than the threshold value Thb (S506: NO), the processing proceeds to Step S508.

In Step S507, the pan/tilt detector 67 increments a count value count2.

In Step S508, the pan/tilt detector 67 sets the count value count2 to "0".

In Step S509, when the count value count2 exceeds a threshold value THB (S509: YES), the processing proceeds to Step S510. When the count value count2 is not greater than the threshold value THB (S509: NO), the processing proceeds to Step S511. The count value count2 is provided to consider a variation in the magnitude (absolute value) of the acceleration in the Y direction due to noise.

In Step S510, the pan/tilt detector 67 sets the flag FL1 to "1". Thereafter, the processing proceeds to Step S512.

In Step S511, when the FL1 is "0" (Step S511: YES), the processing proceeds to Step S512. When the flag FL1 is "1" (Step S511: NO), the processing proceeds to Step S513.

In Step S512, when the magnitude (absolute value) of the angular shake amount $\beta 1$ in the pitch direction exceeds an adjustment start threshold value TH1 (S512: YES), the processing proceeds to Step S514. When the magnitude (absolute value) of the angular shake amount $\beta 1$ in the pitch direction is not greater than the adjustment start threshold value TH1 (S512: NO), the processing is returned.

In Step S514, the pan/tilt detector 67 sets the flag FL1 to "1". Thereafter, the processing is returned.

In Step S513, when the magnitude of the angular shake amount $\beta 1$ in the pitch direction is less than or equal to an adjustment end threshold value TH2 (S513: YES), the processing proceeds to Step S515. When the magnitude of the angular shake amount $\beta 1$ in the pitch direction exceeds the adjustment end threshold value TH2 (S513: NO), the processing is returned.

In Step S515, the pan/tilt detector 67 sets the flag FL1 to "0". Thereafter, the processing is returned.

A procedure of detecting (setting the flag FL2) the pan operation due to the angular shake in the yaw direction of the imaging apparatus 1030, a procedure of detecting (setting the flag FL3) the pan operation due to the shift shake in the X direction of the imaging apparatus 1030, and a procedure of detecting (setting the flag FL4) the pan operation due to the shift shake in the Y direction of the imaging apparatus 1030 are also similar to the procedure in FIG. 21. However, the threshold values THa, THA, THb, THB, TH1, and TH2 may be made different from each other.

As described above, according to the present embodiment, the accuracy of detecting the pan or tilt can be improved by using not only the shake amount calculated by the shake operation part but also the output signal of the angular velocity sensor 6 and the output signal of the acceleration sensor 7 for the detection of the pan or tilt.

Incidentally, although the switching of the operation system has been described as the switching of the cut-off frequency of the imperfect integrator in the present embodiment as with the third embodiment, the present embodiment is not limited to it. As with the fourth embodiment, the switching of the operation system may be made by the switching of execution of the integral operation of the imperfect integrator or the stop of the integral operation, and a monotonous decrease in the integrated value immediately before its stop.

Seventh Embodiment

In the present embodiment, each flag is set based on a combined angular shake amount, and the operation systems of two shake operation parts are set based on one flag.

FIG. 22 is a diagram showing the relation of a flag, information identified by the flag, reference data referred to for setting the flag, and an operation system set by the flag in the seventh embodiment.

A pan/tilt detector 67 detects a tilt operation of an imaging apparatus 1030 on the basis of an angular velocity in a pitch direction outputted from an angular velocity sensor 6, an acceleration in a Y direction outputted from an acceleration sensor 7, and a combined angular shake amount β. The pan/tilt detector 67 sets a flag FLP indicative of the presence or absence of the tilt operation. When the flag FLP is "1", it indicates that the tilt operation is present. When the flag FLP is "0", it indicates that the tilt operation is absent. A procedure of setting the flag FLP by the pan/tilt detector 67 is similar to that shown in FIG. 21 except that a combined angular shake amount β is used in place of an angular shake amount pi.

An adjuster 18 sets the operation system of a first angular shake operation part 11a and the operation system of a second shift shake operation part 12b, based on the flag FLP. When the flag FLP is set to 0, the adjuster 18 sets the operation system of the first angular shake operation part 11a to a first operation system and sets the operation system of the second shift shake operation part 12b to the first operation system. When the flag FLP is set to 1, the adjuster 18 sets the operation system of the first angular shake operation part 11a to a second operation system and sets the operation system of the second shift shake operation part 12b to the second operation system.

The pan/tilt detector 67 detects the presence or absence of a pan operation of the imaging apparatus 1030 on the basis of an angular velocity in a yaw direction outputted from the angular velocity sensor 6, an acceleration in an X direction outputted from the acceleration sensor 7, and a combined angular shake amount α. The pan/tilt detector 67 sets a flag FLY indicative of the presence or absence of the pan operation. When the flag FLY is "1", it indicates that the pan operation is present. When the flag FLY is "0", it indicates that the pan operation is absent.

A procedure of setting the flag FLY by the pan/tilt detector 67 is similar to that shown in FIG. 21 except that a combined angular shake amount α is used in place of an angular shake amount α1.

The adjuster 18 sets the operation system of a second angular shake operation part 11b and the operation system of a first shift shake operation part 12a, based on the flag FLY. When the flag FLY is set to 0, the adjuster 18 sets the operation system of the second angular shake operation part 11b to the first operation system and sets the operation system of the first shift shake operation part 12a to the first operation system. When the flag FLY is set to 1, the adjuster 18 sets the operation system of the second angular shake operation part 11b to the second operation system and sets the operation system of the first shift shake operation part 12a to the second operation system.

According to the present embodiment as described above, there are set the two shake operation parts 11a and 12b each determining the shake in the pitch direction on the basis of the combined angular shake amount β in the pitch direction, the angular velocity in the pitch direction, and the acceleration in the Y direction. There are set the two shake operation parts 11b and 12a each determining the shake in the yaw direction on the basis of the combined angular shake amount α in the yaw direction, the angular velocity in the yaw direction, and the acceleration in the X direction. It is thus possible to perform a higher accurate camera-shake correction.

Incidentally, the operation systems of the four shake operation parts 11a, 11b, 12a, and 12b may be set using the shake amount obtained by combing the combined angular shake amount β in the pitch direction and the combined angular shake amount in the yaw direction, the angular velocity obtained by combining the angular velocity in the pitch direction and the angular velocity in the yaw direction, and the acceleration obtained by combining the acceleration in the X direction and the acceleration in the Y direction.

Incidentally, although the switching of the operation system has been described as the switching of the cut-off frequency of the imperfect integrator in the present embodiment as with the third embodiment, the present embodiment is not limited to it. As with the fourth embodiment, the switching of the operation system may be made by the switching of execution of the integral operation of the imperfect integrator or the stop of the integral operation, and a monotonous decrease in the integrated value immediately before its stop.

What is claimed is:

1. An imaging apparatus comprising:
 a camera controller including an imperfect integrator, wherein the imperfect integrator:
    operates in a first operation mode or a second operation mode;
    receives an acceleration or angular velocity from one or more sensors mounted in the imaging apparatus;
    calculates a shake amount of the imaging apparatus based on the acceleration or the angular velocity; and
    outputs the calculated shake amount of the imaging apparatus to the camera controller,
 wherein the camera controller:
    determines, based on the calculated shake amount, a camera-shake correction amount; and
    controls, based on the camera-shake correction amount, an actuator driving a corrective lens included in an imaging optical system of the imaging apparatus; and
    adjusts an operation mode of the imperfect integrator based on 1) the calculated shake amount and 2) which operation mode the imperfect integrator operates at a time of when the imperfect integrator calculated the shake amount,
 wherein when the operation mode of the imperfect integrator at a time of when the imperfect integrator calculated the shake amount is the first operation mode and when a magnitude of the calculated shake amount exceeds a first shake amount threshold value, the camera controller adjusts the operation mode of the imperfect integrator to the second operation mode,
 wherein when the operation mode of the imperfect integrator at the time when the imperfect integrator calculated the shake amount is the first operation mode and when the magnitude of the calculated shake amount is equal to or less than a second shake amount threshold value, the camera controller sets the operation mode of the imperfect integrator to the first operation mode,
 wherein the second shake amount threshold value is smaller than the first shake amount threshold value, and
 wherein the camera controller:
    causes the imperfect integrator to execute an integral operation in the first operation mode;

causes the imperfect integrator to stop the integral operation in the second operation mode;

reduces, with time, a value outputted from the imperfect integrator immediately before the stop of the integral operation; and causes the imperfect integrator to output the reduced value as the calculated shake amount.

2. The imaging apparatus according to claim 1, wherein in the second operation mode, the imperfect integrator increases or decreases a cut-off frequency of the imperfect integrator more than in the first operation mode.

3. The imaging apparatus according to claim 2, wherein the camera controller sets the operation mode of the imperfect integrator based on the calculated shake amount and the acceleration or the angular velocity from the one or more sensors mounted in the imaging apparatus.

4. The imaging apparatus according to claim 3, wherein when a current operation mode of the imperfect integrator is the first operation mode and when a number of times a magnitude of the acceleration or a magnitude of the angular velocity from the one or more sensors mounted in the imaging apparatus exceeds an acceleration/velocity threshold value is less than a count threshold value, the camera controller:

sets the operation mode of the imperfect integrator to the second operation mode when the magnitude of the calculated shake amount exceeds the first shake amount threshold value; and maintains the operation mode of the imperfect integrator at the first operation mode when the magnitude of the calculated shake amount is less than or equal to the first shake amount threshold value.

5. The imaging apparatus according to claim 4, wherein when the current operation mode of the imperfect integrator is the second operation mode or the number of times the magnitude of the acceleration or the magnitude of the angular velocity from the one or more sensors mounted in the imaging apparatus exceeds the acceleration/velocity threshold value is the count threshold value or more, the camera controller:

sets the operation mode of the imperfect integrator to the first operation mode when the magnitude of the calculated shake amount is less than or equal to the second shake amount threshold value; and sets the operation mode of the imperfect integrator to the second operation mode when the magnitude of the calculated shake amount exceeds the second shake amount threshold value.

6. The imaging apparatus according to claim 1, wherein the camera controller stops the input to the imperfect integrator in the second operation mode.

* * * * *